(12) United States Patent
Austria et al.

(10) Patent No.: US 11,618,320 B1
(45) Date of Patent: Apr. 4, 2023

(54) MULTI-PASSENGER INTERACTION

(71) Applicant: Zoox, Inc., Foster City, CA (US)

(72) Inventors: Auver Cedric Austria, San Francisco, CA (US); Riccardo Giraldi, San Francisco, CA (US); Andrew Allen Haskin, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 144 days.

(21) Appl. No.: 17/100,248

(22) Filed: Nov. 20, 2020

(51) Int. Cl.
*B60K 35/00* (2006.01)

(52) U.S. Cl.
CPC ........ *B60K 35/00* (2013.01); *B60K 2370/152* (2019.05); *B60K 2370/166* (2019.05); *B60K 2370/52* (2019.05); *B60K 2370/73* (2019.05)

(58) Field of Classification Search
CPC ...... B60Q 1/2657; B60Q 1/2692; B60Q 1/50; B60Q 1/5037; B60Q 1/507; B60Q 1/549; B60W 30/00; B62D 24/00; B62D 27/06; G05D 1/021
See application file for complete search history.

(56) References Cited

U.S. PATENT DOCUMENTS

| | | |
|---|---|---|
| D288,631 S | 3/1987 | Mample |
| D711,895 S | 8/2014 | Inose et al. |
| D722,325 S | 2/2015 | Williams et al. |
| D730,935 S | 6/2015 | Franganillo et al. |
| D736,830 S | 8/2015 | Lyman et al. |
| D771,076 S | 11/2016 | Butcher et al. |
| D771,704 S | 11/2016 | Park et al. |
| D773,525 S | 12/2016 | Quirino et al. |
| D777,735 S | 1/2017 | Kim et al. |
| 9,612,123 B1 | 4/2017 | Levinson et al. |
| D786,278 S | 5/2017 | Motamedi |
| D786,893 S | 5/2017 | Mariet et al. |
| D788,169 S | 5/2017 | Wessel |
| D789,952 S | 6/2017 | Maitlen et al. |
| D798,334 S | 9/2017 | Dye et al. |
| D819,695 S | 6/2018 | Rowe et al. |
| D837,823 S | 1/2019 | Morgan et al. |
| D838,281 S | 1/2019 | Buchter et al. |
| 10,268,191 B1 | 4/2019 | Lockwood et al. |
| D849,025 S | 5/2019 | Buchter et al. |
| 10,304,191 B1 | 5/2019 | Mousavian et al. |
| D851,681 S | 6/2019 | Niven et al. |

(Continued)

OTHER PUBLICATIONS

Chinese Office Action dated Jan. 5, 2022 for Chinese Patent Application No. 202130303411.9, a foreign counterpart to U.S. Appl. No. 29/759,240, 1 page.

(Continued)

*Primary Examiner* — Nelson M Rosario
(74) *Attorney, Agent, or Firm* — Lee & Hayes, P.C.

(57) ABSTRACT

Techniques relating to multi-passenger interaction via display(s) of a vehicle are described. In an example, sensor data is received from a sensor associated with an interior of a vehicle. Based at least partly on the sensor data, a first occupancy state associated with a first seat of the vehicle and a second occupancy state associated with a second seat of the vehicle can be determined. Content to present via displays associated with the first seat and/or the second seat can be determined based at least in part on the first occupancy state and the second occupancy state and can be presented via each respective display.

20 Claims, 15 Drawing Sheets

(56) References Cited

U.S. PATENT DOCUMENTS

| | | |
|---|---|---|
| 10,317,240 B1 | 6/2019 | Di Pietro et al. |
| 10,317,897 B1 | 6/2019 | Kentley-Klay et al. |
| 10,353,390 B2 | 7/2019 | Linscott et al. |
| D856,371 S | 8/2019 | Park et al. |
| 10,386,836 B2 | 8/2019 | Lockwood et al. |
| 10,509,947 B1 | 12/2019 | Douillard et al. |
| 10,535,138 B2 | 1/2020 | Pfeiffer |
| 10,584,971 B1 | 3/2020 | Askeland |
| D882,631 S | 4/2020 | Roszczewski |
| D890,207 S | 7/2020 | Kentley-Klay et al. |
| D890,809 S | 7/2020 | Liu et al. |
| D892,136 S | 8/2020 | Baber et al. |
| D909,413 S | 2/2021 | Lee et al. |
| D920,348 S | 5/2021 | Patel et al. |
| D921,548 S | 6/2021 | Franganillo et al. |
| D927,522 S | 8/2021 | Miloseski et al. |
| D939,547 S | 12/2021 | Vaccari et al. |
| D948,563 S | 4/2022 | Higgs et al. |
| 2019/0196679 A1* | 6/2019 | You .................. G06F 3/0484 |
| 2020/0047641 A1* | 2/2020 | D'Eramo ............ B60N 2/002 |
| 2021/0347415 A1* | 11/2021 | Nishio ................ B62D 24/00 |

OTHER PUBLICATIONS

Chinese Office Action dated Oct. 20, 2021 for Chinese Patent Application No. 202130303519.8, a foreign counterpart to U.S. Appl. No. 29/759,234, 2 pages.

GB Office Action dated Jul. 2, 2021 for Design Patent Application No. 6137881, a foreign counterpart to U.S. Appl. No. 29/759,234, 2 pages.

GB Office Action dated Jul. 2, 2021 for Design Patent Application No. 6137882, a foreign counterpart to U.S. Appl. No. 29/759,234, 2 pages.

GB Office Action dated Jul. 2, 2021 for Design Patent Application No. 6137887, a foreign counterpart to U.S. Appl. No. 29/759,234, 2 pages.

GB Office Action dated Jul. 2, 2021 for Design Patent Application No. 6137894, a foreign counterpart to U.S. Appl. No. 29/759,240, 2 pages.

GB Office Action dated Jul. 2, 2021 for Great Britain Patent Application No. 6137894, 2 pages.

Japanese Office Action dated Jan. 18, 2022 for Japanese Patent Application No. 2021-010806, a foreign counterpart to U.S. Appl. No. 29/759,234, 9 pages.

Japanese Office Action dated Jan. 28, 2022 for Japanese Patent Application No. 2021-010814, a foreign counterpart to U.S. Appl. No. 29/759,234, 9 pages.

Japanese Patent Office Action dated Jan. 28, 2022 for Patent Application No. 2021-010790, a foreign counterpart to U.S. Appl. No. 29/759,234, 9 pages.

Japanese Office Action dated Oct. 1, 2021 for Japanese Patent Application No. 2021-010812, a foreign counterpart to U.S. Appl. No. 29/759,234, 7 pages.

Japanese Office Action dated Oct. 1, 2021 for Japanese Patent Application No. 2021-010812, a foreign counterpart to U.S. Appl. No. 29/759,234, 8 pages.

Japanese Office Action dated Oct. 8, 2021 for Japanese Patent Application No. 2021-010802, a foreign counterpart to U.S. Appl. No. 29/759,234, 3 pages.

Japanese Office Action dated Oct. 8, 2021 for Japanese Patent Application No. 2021-010803, a foreign counterpart to U.S. Appl. No. 29/759,234, 3 pages.

Japanese Office Action dated Oct. 8, 2021 for Japanese Patent Application No. 2021-010804, a foreign counterpart to U.S. Appl. No. 29/759,234, 3 pages.

Japanese Office Action dated Oct. 8, 2021 for Japanese Patent Application No. 2021-010805, a foreign counterpart to U.S. Appl. No. 29/759,234, 3 pages.

Japanese Office Action dated Feb. 18, 2022 for Japanese Patent Application No. 2021-010928, a foreign counterpart to U.S. Appl. No. 29/759,240, 23 pages.

Japanese Office Action dated Mar. 11, 2022 for Japanese Patent Application No. 2021-010922, a foreign counterpart to U.S. Appl. No. 29/759,240, 3 pages.

Bloomberg Quicktake, "Zoox $800M Robo Taxi Could beat Tesla and Uber", Jul. 17, 2018, youtube.com, retrieved Jul. 1, 2022, https://www.youtube.com/watch?v=Oj DLwnTyybo (Year: 2018), 4 pages.

Japanese Office Action dated Sep. 2, 2022 for Japanese Patent Application No. 2021-010928, a foreign counterpart to U.S. Appl. No. 29/759,240, 3 pages.

\* cited by examiner

MULTI-PASSENGER INTERACTION

BACKGROUND

Vehicles can encounter many situations in which communication with passengers may be helpful. In vehicles driven by drivers, drivers can talk with passengers to inform them of environmental changes or the like. However, in driverless vehicles (e.g., autonomous vehicles), passengers can be left without means for understanding environmental changes or other factors affecting rides in such vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
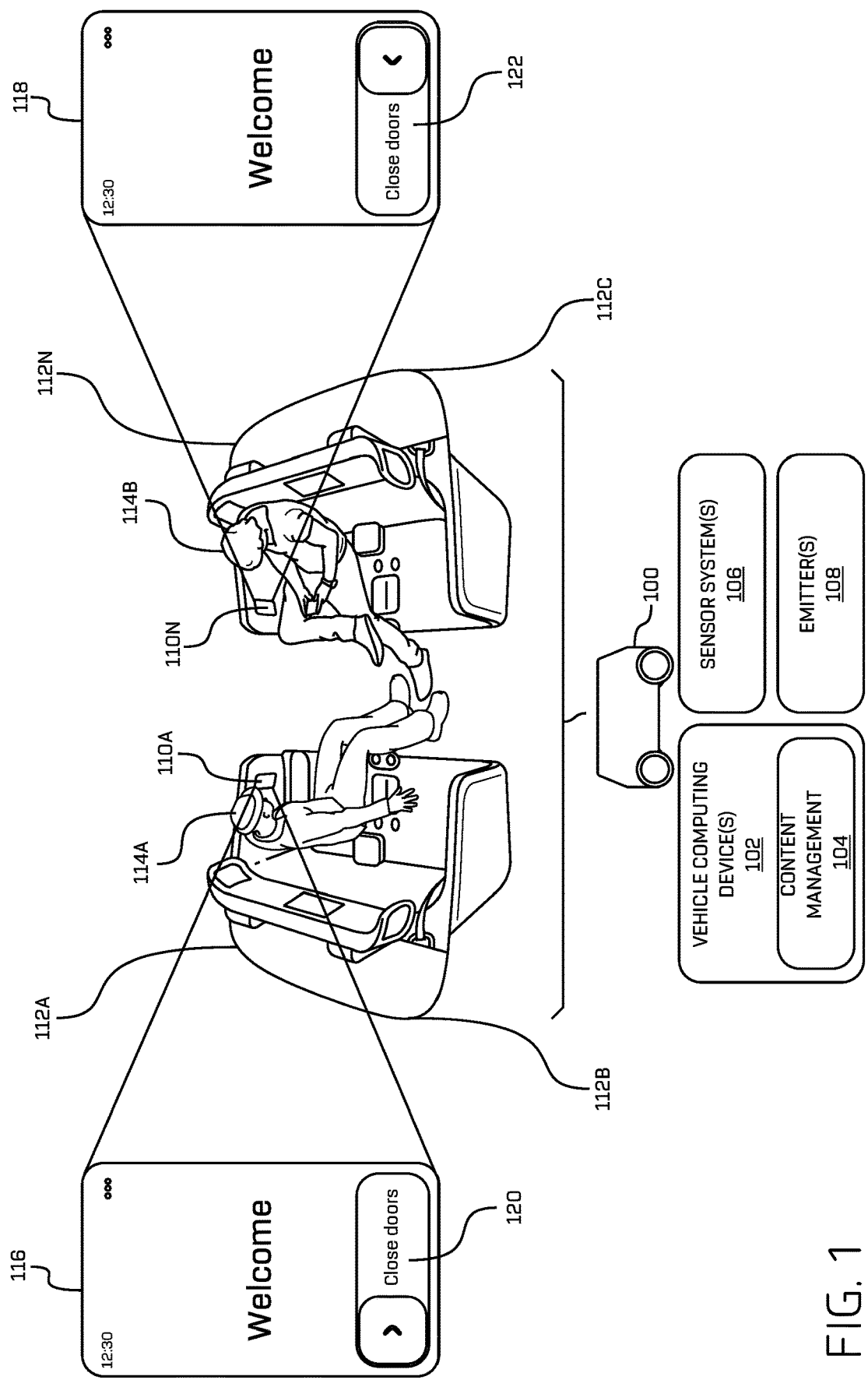
FIG. 1 illustrates an example vehicle associated with one or more displays for enabling multi-passenger interaction, as described herein.

Techniques described herein are directed to facilitating interaction by multiple different passengers with a vehicle and/or a service (e.g., a transportation service) via displays, or other user interfaces, associated with the vehicle and/or service. In an example, two or more passengers of a vehicle can each interact with respective displays, while in the vehicle, to interact with the vehicle and/or the service. As an example, a first passenger can interact with a first display to cause the vehicle to start moving (e.g., start a trip) and, in some examples, a second passenger can view, via a second display, an indication that the vehicle is starting to move. That is, in some examples, techniques described herein enable passengers of the vehicle to passively observe interactions of other passengers in the vehicle. As another example, the first passenger can interact with the first display to cause the vehicle to start moving (e.g., start a trip) and, in some examples, the second passenger can interact with the second display to instruct the vehicle to perform a different operation (e.g., stop, open the door(s) of the vehicle, etc.). That is, in some examples, the second passenger can provide an input, via the second display, to override, modify, and/or supplement an input provided by the first passenger via the first display. That is, techniques described herein enable passengers of the vehicle to interact with the vehicle and/or the service via respective displays. In some examples, each passenger in the vehicle can interact with a respective display to set and/or modify details of a trip, control ambient temperature, control ambient music, and/or control other vehicle states or settings. That is, techniques described herein can enable passengers to control aspects of the vehicle and/or service via interactions with respective displays.

As described above, techniques described herein are directed to facilitating multi-passenger interaction (e.g., interaction by and/or between multiple different passengers and a vehicle) via displays associated with a vehicle. In some examples, individual of the displays can be disposed within the vehicle at a position proximate a seat in the vehicle. In some examples, a display can be associated with a mobile device of a passenger that can be paired with, or otherwise in communication with, computing device(s) of the vehicle. In at least one example, the display(s) can provide vehicle interface(s) for communications and messaging (e.g., between passengers and the vehicle and/or the service). In at least one example, content presented via the display(s) (e.g., via graphical user interface(s) presented thereby) can be determined based at least in part on state(s) of the vehicle. For example, a vehicle can be associated with one or more states, including but not limited to, an ingress state (e.g., wherein the vehicle is stopped and is configured to allow a passenger to enter the vehicle, such as through open door(s)), a door opening state (e.g., a state wherein door(s) of the vehicle are opening or preparing to open), a door closing state (e.g., a state wherein door(s) of the vehicle are closing or preparing to close), a departing state (e.g., a state wherein the vehicle computing device(s) 102 have initialized vehicle system(s) to start moving), a ride-in-progress state (e.g., a state wherein the vehicle is travelling on a trip and/or to pick up or drop off a passenger), an arriving state (e.g., a state wherein the vehicle is approaching a destination), an egress state (e.g., a state wherein the vehicle is stopped and is configured to allow a passenger to exit the vehicle, such as through open door(s)), or the like. Each state can be associated with content that can be presented via the display(s).

In some examples, occupancy data can be used to determine which seat(s) in a vehicle are occupied (e.g., associated with an occupied state) or not, and such a determination can be used to selectively determine which display(s) to present content on and/or which content to present. In some examples, data associated with passenger(s) of the vehicle—such as trip data, user data (e.g., preferences, abilities, classifications (e.g., adult, child, etc.)), context data (e.g., what the passenger is doing and/or how the passenger is interacting with a respective display, what other passenger(s) are doing and/or how other passenger(s) are interacting with their respective display(s), what content was previously presented, etc.), or the like can be used to determine at least one of (i) content to be presented via a respective display and/or (ii) how such content is presented (e.g., presentation characteristic(s) associated therewith). In some examples, vehicle data associated with the vehicle can be used to determine at least one of (i) content to be presented via a respective display and/or (ii) how such content is presented (e.g., presentation characteristic(s) associated therewith). That is, techniques described herein can intelligently determine and/or present content to enable passenger interaction via displays associated with a vehicle. As described herein, such content can enable passenger(s) to interact with the vehicle and/or each other. Examples are provided below.

While content presentation to enable multi-passenger interaction is described above, in at least one example, techniques described herein additionally enable passenger interaction with the vehicle via the same display(s) enabling multi-passenger interaction. That is, in at least one example, a display can present content associated with a state of the vehicle and a prompt for the respective passenger to perform an operation. For example, the prompt can instruct the passenger to hold their finger, or provide another input, on a particular user interface element to start a trip, or otherwise cause the vehicle to begin to move. Based at least in part on detecting an interaction via the display, computing device(s) associated with the vehicle can cause the vehicle to begin to move. That is, computing device(s) associated with the vehicle can cause instructions to be sent to vehicle system(s) to initialize movement. In some examples, multiple passengers can interact with their respective displays which can result in conflicting operations sought by each of the passengers (e.g., start trip and stop, start trip and open doors, or the like). In such examples, computing device(s) associated with the vehicle can resolve the conflict, based at least in part on rule(s), and can send instructions to relevant vehicle system(s) to control the vehicle. Additional details are described below.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. In one example, the techniques described herein may be utilized in driver-controlled vehicles. In another example, the techniques can be utilized in an aviation or nautical context, or in any context involving transportation of one or more passengers. That is, while techniques described herein are described with reference to autonomous vehicles, techniques described herein can be applied in additional or alternative contexts.

FIG. 1 illustrates an example vehicle 100. In at least one example, the vehicle 100 can be an autonomous vehicle configured to operate according to a Level 5 classification issued by the U.S. National Highway Traffic Safety Administration, which describes a vehicle capable of performing all safety-critical functions for an entire trip, with the driver (or occupant) not being expected to control the vehicle at any time. In such an example, since the vehicle 100 can be configured to control all functions from start to stop, including all parking functions, it can be driverless. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 100 is an autonomous vehicle; however, the vehicle 100 could be any other type of vehicle.

In at least one example, the vehicle 100 can be associated with vehicle computing device(s) 102 which can include one or more components for controlling the vehicle 100. In at least one example, the one or more components can include a content management component 104. In at least one example, the vehicle 100 can be associated with one or more sensor components 106 and one or more emitters 108. In at least one example, the vehicle 100 can be associated with one or more displays 110(A)-110(N) for enabling multi-passenger interaction, as described herein. In at least one example, the display(s) 110(A)-110(N) can be associated with the emitter(s) 108. That is, at least one type of emitter associated with the vehicle 100 can be a display. Additional details associated with the vehicle computing device(s) 102, the sensor component(s) 106, and the emitter(s) 108 are described below with reference to FIG. 10.

Figure 4:
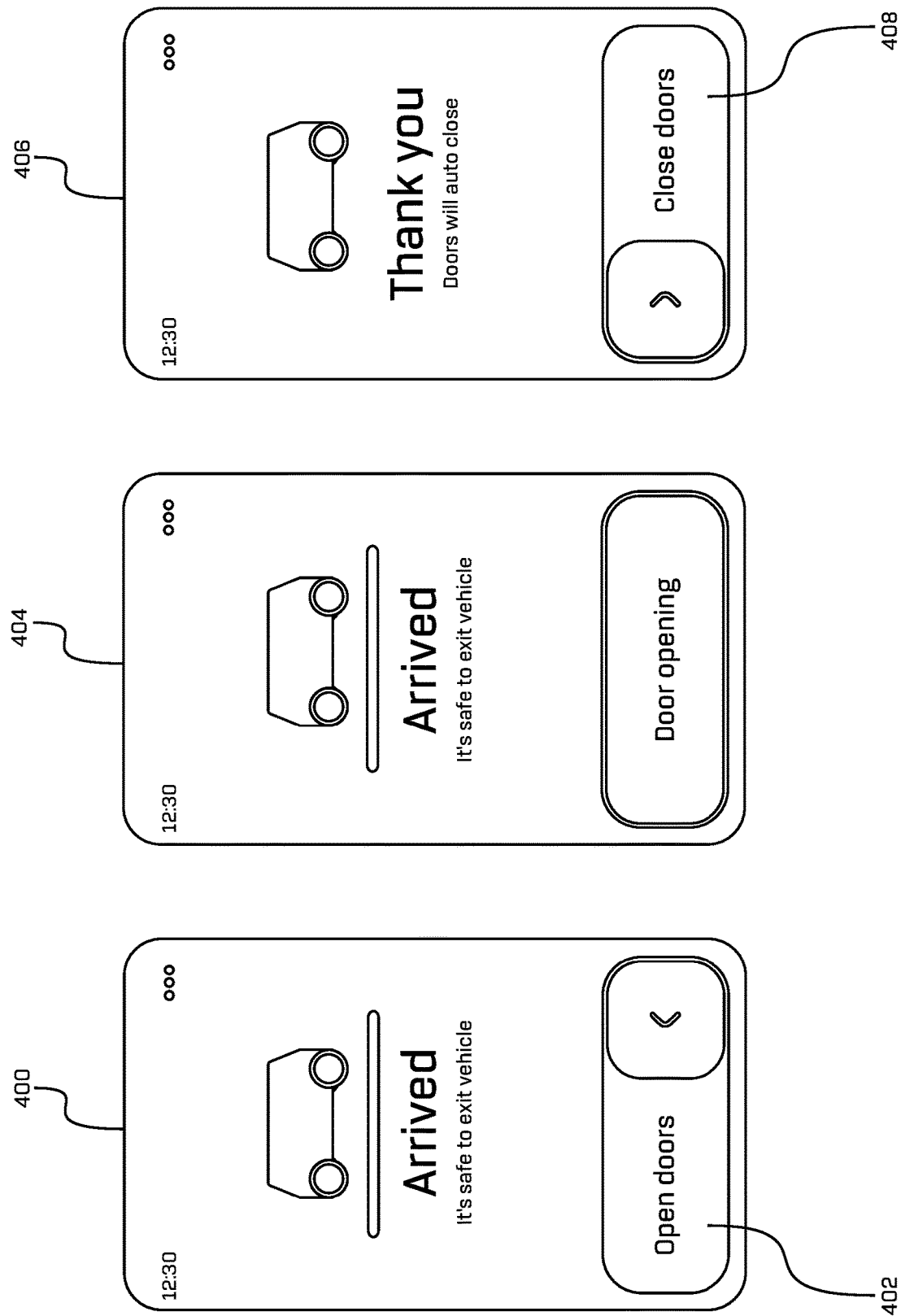
FIG. 4 illustrates a plurality of graphical user interfaces that can be presented via a display associated with a vehicle in association with one or more states of the vehicle, as described herein.

In at least one example, the vehicle 100 can have one or more seats 112(A)-112(N). In FIG. 4, four seats are shown, but the vehicle 100 can have more or fewer seats. In some examples, each of the seat(s) 112(A)-112(N) can be associated with an occupancy state indicating whether the seat is occupied (or not). In at least one example, sensor data, which can be received from the sensor component(s) 106, can be used to determine an occupancy state associated with a seat. In at least one example, each of the seats 112(A)-112(N) can include a seat sensor configured to generate signals indicative of whether a passenger is sitting in the respective seat. In some examples, the seat sensor can include a pressure sensor and/or a weight sensor. In some examples, the seat sensor can provide weight and/or pressure data and location data to the content management component 104, which can use the weight and/or pressure data and location data to determine whether a seat corresponding to the location data is occupied (e.g., the weight and/or pressure data satisfies a threshold). In at least one example, each of the sensor component(s) 106 can include a camera or other vision system, which can capture image(s) of the interior (and/or exterior) of the vehicle 100. In at least one example, content management component 104 can analyze the image(s) to determine whether a passenger is sitting in a particular seat. The content management component 104 can receive sensor data from the sensor component(s) 106 (e.g., from the seat sensor, camera(s), etc.) and can determine an occupancy state associated with each seat of the one or more seats 112(A)-112(N).

In at least one example, each seat can have a display disposed proximate thereto. In some examples, the display(s) 110(A)-110(N) can be affixed to the interior of the vehicle 100. In some examples, the display(s) 110(A)-110(N) can be removable. In some examples, the display(s) 110(A)-110(N) can be associated with computing device(s) of passenger(s), that can be paired with, or otherwise associated with, the vehicle computing device(s) 102 of the vehicle 100. In some examples, each passenger 114(A)-114(N) can have their own display. In some examples, multiple passengers 114(A)-114(N) can interact with a same display and/or a passenger 114(A)-114(N) can interact with multiple displays 110(A)-110(N). That is, while shown as a one-to-one configuration, in some examples, the display(s) 110(A)-110(N) can be in a many-to-one or one-to-many configuration. Furthermore, in some examples, content can be output via additional or alternative emitter(s) 108. That is, in some examples, content can be output via a display (as described), a speaker, a haptic user interface, and/or the like.

In FIG. 1, a display 110(A) is disposed proximate to a seat 112(A) within which a passenger 114(A) is seated and a display 110(N) is disposed proximate to a seat 112(N) within which a passenger 114(B) is seated. In some examples, the passenger 114(A) and the passenger 114(B) can be associated with a same trip or different trips. For the purpose of this discussion, a "trip" can reference travel from an origin to a destination, which can be associated with global positioning system (GPS) coordinates or another geolocation associated with a map of an environment. In at least one example, the origin and the destination can be used by the vehicle computing device(s) 102 for determining instructions for controlling the vehicle 100 to travel from the origin to the destination. In at least one example, a "ride" can reference a trip from a perspective of a passenger. That is, while the vehicle 100 performs a trip, the passenger 114(A) and the passenger 114(B) can enjoy a ride.

In some examples, each of the display(s) 110(A)-110(N) can present the same content or different content. In some examples, a subset of the display(s) 110(A)-110(N), such as display(s) 110(A) and 110(N) that are proximate occupied seats (e.g., seats associated with an occupied state), can present content. In some examples, content presented via the display(s) 110(A)-110(N) can be determined by the content management component 104 based at least in part on a state of the vehicle 100, trip data, user data, context data, and/or the like. Examples are provided below. In at least one example, content can be presented as graphical user interface(s) presented via the display(s) 110(A)-110(N). That is, the content management component 104 can determine content, at least a portion of which can be presented via a graphical user interface associated with a display of the display(s) 110(A)-110(N).

As illustrated in FIG. 1, graphical user interface 116 is presented via the display 110(A) and graphical user interface 118 is presented via the display 110(N). As illustrated, the vehicle 100 can be associated with an ingress state wherein the vehicle 100 is stopped and the passenger(s) 114(A) and 114(B) have entered the vehicle 100. In at least one example, the graphical user interface 116 and the graphical user interface 118 can each include a user interface element 120 and 122, respectively, that can cause door(s) associated with the vehicle 100 to close. That is, in at least one example, based at least in part on detecting actuation of either the user interface element 120 or the user interface element 122, the vehicle computing device(s) 102 associated with the vehicle 100 can cause the door(s) associated with the vehicle 100 to close. The graphical user interfaces 116 and 118 are but two examples of graphical user interfaces that can be presented via display(s) described herein.

Figure 2:
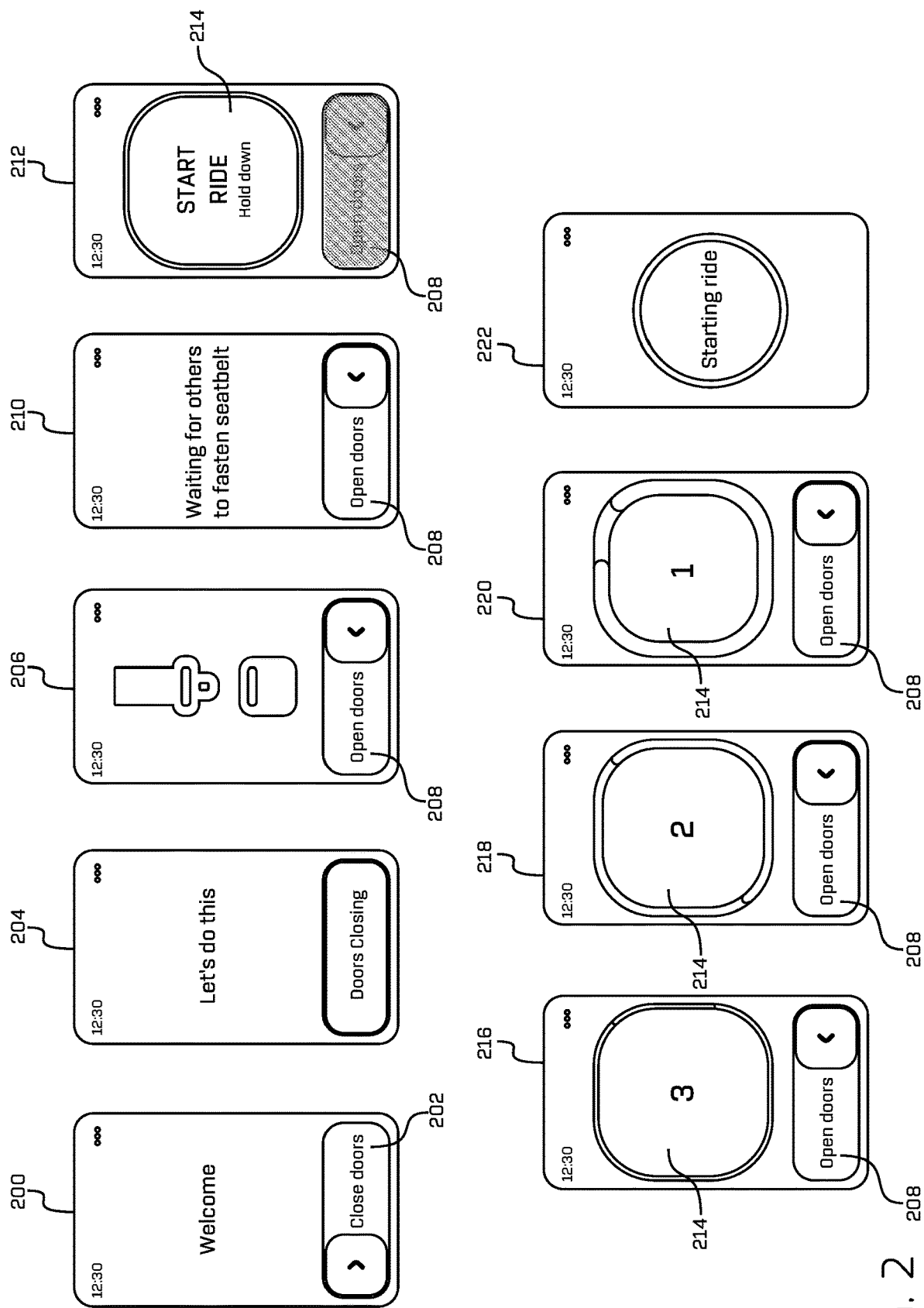
FIG. 2 illustrates a plurality of graphical user interfaces that can be presented via a display associated with a vehicle in association with one or more states of the vehicle, as described herein.

FIG. 2 illustrates a plurality of graphical user interfaces that can be presented via a display, such as the display 110(A), associated with a vehicle, such as the vehicle 100, in association with one or more states of the vehicle 100, as described herein. As described above, in at least one example, the content management component 104 can determine content to present via the display 110(A). In some examples, such content can be determined based at least in part on a state of the vehicle 100. Example states can include an ingress state, a door opening state, a door closing state, a departing state, a ride-in-progress state, an arriving state, an egress state, or the like. In some examples, each state can be associated with content, or instructions indicative thereof, that can be presented via the display 110(A). In at least one example, the content management component 104 can determine a state of the vehicle 100 and can access content that is mapped to, or otherwise associated with, the state. In some examples, additional or alternative interior or exterior characteristics can be mapped to, or otherwise associated with, the state. For instance, interior and/or exterior sound and/or lighting can be determined based at least partly on the state of the vehicle 100.

As an example, in FIG. 2, a graphical user interface 200 is illustrated. In at least one example, the content management component 104 can determine a state associated with the vehicle 100, which can be an ingress state, and content presented via the graphical user interface 200 can be determined at least in part on the ingress state. In at least one example, the graphical user interface 200 can include a user interface element 202 that, when actuated, can cause the vehicle computing device(s) 102 to effectuate an action (e.g., cause the door(s) of the vehicle 100 to close). A "user interface element," as used herein, can refer to a textual element, a graphical element, an image element, a control element (e.g., a button, a slider, etc.), and/or any other element that can be presented via a graphical user interface to convey information and/or enable an operation to be performed.

In at least one example, the passenger 114(A) can interact with the graphical user interface 200 (e.g., via the user interface element 202) to cause the vehicle computing device(s) 102 to perform an operation (e.g., close the door(s) of the vehicle 100). In at least one example, another graphical user interface 204 can be presented via the display 110(A) to indicate that the operation is being performed (e.g., the door(s) are closing). That is, in at least one example, based at least in part on detecting an input associated with the user interface element 202 (e.g., actuation of the user interface element 202), the content management component 104 can determine content to be presented via the graphical user interface 204. In at least one example, such content can be referred to as "updated content," such that when presented via the display 110(A), the graphical user interface can be updated. In some examples, such an update can result from a new graphical user interface being presented or a currently presented graphical user interface being updated.

In some examples, individual of the display(s) 110(A)-110(N) can be updated to present the graphical user interface 204 based on the interaction between the passenger 114(A) and the graphical user interface 200. In some examples, the graphical user interface 204 can be presented via each of the display(s) 110(A)-110(N). In some examples, the content management component 104 can determine which of the seat(s) 112(A)-112(N) are associated with an occupied state and can cause the graphical user interface 204 to be presented via each of the display(s) 110(A)-110(N) proximate a seat associated with an occupied state.

In at least one example, the content management component 104 can determine additional content to be presented via the display(s) 110(A)-110(N) via another user interface 206. In some examples, the additional content can be determined based at least in part on the state of the vehicle 100 and, in some examples, context data indicating a previous graphical user interface presented and/or a previous interaction with one or more of the display(s) 110(A)-110(N). In at least one example, the graphical user interface 206 can be presented via the display 110(A). The graphical user interface 206 can prompt the passenger 114(A) to fasten their seatbelt. In some examples, the graphical user interface 206 can include a user interface element 208 that can enable the passenger 114(A) to request to open the door(s) of the vehicle 100 or perform another operation. In some examples, the graphical user interface 206 can be presented until the content management component 104 determines that the seatbelt associated with the seat 112(A) has been fastened. In some examples, such a determination can be made based on sensor data received from the sensor component(s) 106 and/or an indication associated therewith.

In some examples, graphical user interfaces can be presented based upon satisfaction of a condition (or lack thereof). In at least one example, based at least in part on determining that the passenger 114(A) has fastened their seatbelt (e.g., via an indication from a sensor component of the sensor component(s) 106), the content management component 104 can cause graphical user interface 210 to be presented via the display 110(A) based on a determination that other passenger(s) have not yet fastened their seatbelt(s). That is, the graphical user interface 210 can be presented based at least in part on a determination that (i) the passenger 114(A) has fastened their seatbelt, (ii) another passenger 114(B) is in the vehicle 100, and (iii) the other passenger 114(B) has not yet fastened their seatbelt. Like the graphical user interface 206, the graphical user interface 210 can include the user interface element 208 that can enable the passenger 114(A) to request to open the door(s) of the vehicle 100. In some examples, the user interface element 208 can be presented in association with each graphical user interface associated with a particular state (e.g., ingress).

In at least one example, after determining that each passenger has fastened their seatbelt, the content management component 104 can cause graphical user interface 212 to be presented via the display 110(A). That is, in at least one example, based at least in part on determining that a condition has been satisfied (e.g., each occupied seat is associated with a fastened seatbelt), the content management component 104 can cause the graphical user interface 212 to be presented via the display 110(A). In some examples, the graphical user interface 212 can be presented via each display of the display(s) 110(A)-110(N) or a subset of the display(s) 110(A)-110(N) proximate to seat(s) associated with an occupied state. Similar to the graphical user interface 206, the graphical user interface 210 can include the user interface element 208 that can enable the passenger 114(A) to request to open the door(s) of the vehicle 100.

In at least one example, the graphical user interface 212 can be associated with a user interface element 214 that prompts the passenger 114(A) to interact with the display 110(A) (e.g., by placing their finger or providing another input mechanism on or near the user interface element 214). In some examples, based at least in part on detecting an input associated with the user interface element 214, one or more other user interface elements (e.g., user interface element 208) can be disabled. In at least one example, based at least in part on determining that an input has been sustained for a first period of time, the content management component 104 can determine updated content to be presented via the display 110(A) and can cause graphical user interface 216 to be presented via the display 110(A). The graphical user interface 216 can provide a visual indication that the input has been received, such as by providing a number as part of a countdown and/or a thickening of a border associated with the user interface element 214. In at least one example, based at least in part on determining that an input has been sustained for a second period of time, the content management component 104 can determine updated content to be presented via the display 110(A) and can cause another graphical user interface 218 to be presented via the display 110(A). The graphical user interface 218 can provide another visual indication that the input has been received (or sustained), such as by providing a number as part of a count down and/or a thickening of a border associated with the user interface element 214. In at least one example, based at least in part on determining that an input has been sustained for a third period of time, the content management component 104 can determine updated content to be presented via the display 110(A) and can cause another graphical user interface 220 to be presented via the display 110(A). The graphical user interface 220 can provide another visual indication that the input has been received (or sustained), such as by providing a number as part of a count down and/or a thickening of a border associated with the user interface element 214. Like the graphical user interface 206, the graphical user interfaces 216-220 can include the user interface element 208 that can enable the passenger 114(A) to request to open the door(s) of the vehicle 100.

In at least one example, based at least in part on determining that the input has been sustained for a predetermined period of time (which can comprise the first, second, third, etc. periods of time described above), the content management component 104 can cause another graphical user interface 222 to be presented via the display 110(A). In at least one example, the graphical user interface 222 can be presented based at least in part on the content management component 104 determining that a condition has been satisfied (e.g., that the user interface element 214 was actuated for the predetermined period of time without interruption). In at least one example, based at least in part on determining that the input has been sustained for the predetermined period of time, the content management component 104 can send an indication to another component of the vehicle computing device(s) 102 to control the vehicle 100. For example, based at least in part on determining that the input has been sustained for the predetermined period of time, the content management component 104 can cause the vehicle computing device(s) 102 to send an instruction to initialize one or more vehicle systems to cause the vehicle 100 to start a trip (e.g., and initialize travel along a route). In some examples, an input associated with the user interface element 208 can cause the doors of the vehicle 100 to open. In some examples, an operation may not be performed without input from two or more passengers. In some examples, an operation may not be performed until all passengers 114(A)-114(N) have provided an input.

In some examples, the graphical user interfaces 216-220 can be presented via one or more of the display(s) 110(A)-110(N). In some examples, the graphical user interfaces 216-220 can be presented via a subset of the display(s) 110(A)-110(N), which can be proximate to seat(s) associated with an occupied state. In some examples, such presentation can be passive such that other passengers are informed of what operations are being performed by the vehicle 100 and/or other passengers. In some examples, such presentation can enable other passengers to provide another input that can, in some examples, override, modify, and/or supplement the input via the display 110(A), as described above.

The graphical user interfaces 200-220 can be presented in any combination. That is, while shown in a linear progression, in some examples, an interaction with one of the graphical user interfaces 200-220 can cause any one of the other graphical user interfaces 200-220 to be presented. Furthermore, in some examples, individual of the graphical user interfaces 200-220 can be presented in combination with other graphical user interfaces described below with reference to FIGS. 3 and 4. Additional details are provided below.

Figure 3:
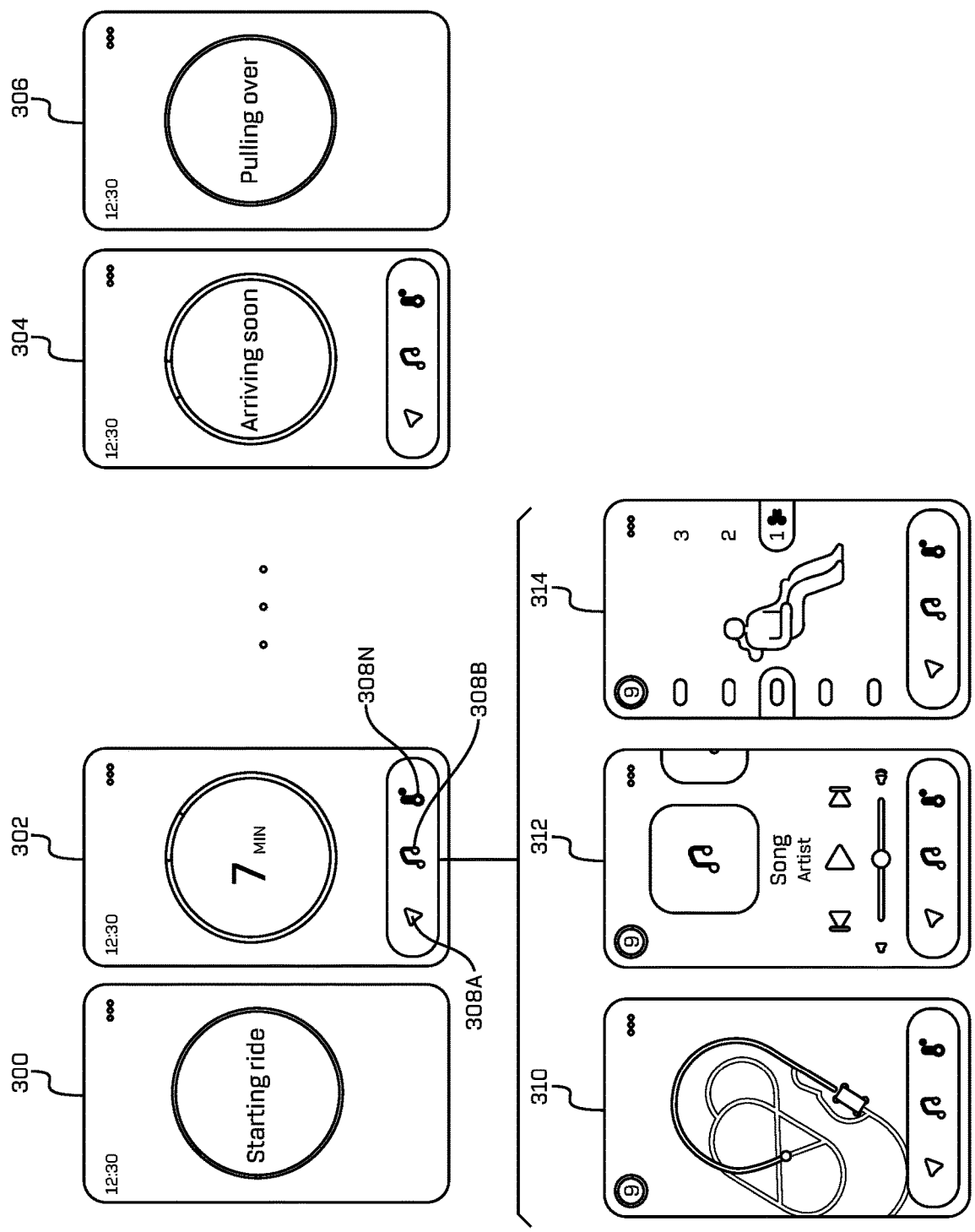
FIG. 3 illustrates a plurality of graphical user interfaces that can be presented via a display associated with a vehicle in association with one or more states of the vehicle, as described herein.

FIG. 3 illustrates a plurality of graphical user interfaces that can be presented via a display, such as the display 110(A), associated with a vehicle, such as the vehicle 100, in association with one or more states of the vehicle 100, as described herein. As described above, in at least one example, the content management component 104 can determine content to present via the display(s) 110(A)-110(N) based at least in part on a state of the vehicle 100. In FIG. 3, a plurality of graphical user interfaces associated with a departing state (e.g., graphical user interface 300), a ride-in-progress state (e.g., graphical user interfaces 302 and 304), an arriving state (e.g., graphical user interface 306), are illustrated.

In at least one example, the graphical user interface 300, which can correspond to the user interface 222, can be associated with a transition out of the ingress state and into a departing state. In at least one example, the graphical user interface 300 can be presented to inform passenger(s) 114(A) and 114(B) that the ride is starting. In at least one example, after the ride has started, the content management component 104 can determine updated content and cause the graphical user interface 302 to be presented via the display(s) 110(A)-110(N). In some examples, each of the display(s) 110(A)-110(N) can present the graphical user interface 302 and, in some examples, a subset of the display(s) 110(A)-110(N) can present the graphical user interface 302 (e.g., the subset can be determined based at least in part on occupancy state of a corresponding seat, as described above). In some examples, the graphical user interface 302 can present information associated with a trip. That is, in such examples, the content management component 104 can receive trip data and determine content to be presented via the graphical user interface 302 based at least in part on the trip data. In some examples, such content can include an estimated time to destination, an estimated time of arrival, route information, or the like.

In some examples, the graphical user interface 302 can include one or more user interface elements 308(A)-308(N) that can enable the passenger 114(A) to access additional or alternative graphical user interfaces and/or functionality associated therewith. For example, an input associated with the user interface element 308(A) can cause graphical user interface 310 to be presented via the display 110(A). In at least one example, the graphical user interface 310 can present trip details on a map or other representation of an environment within which the vehicle 100 is travelling. The graphical user interface 310 can enable the passenger 114(A) to follow the route of the vehicle 100. In some examples, details associated with the route can be presented via the graphical user interface 310. In at least one example, the passenger 114(A) can interact with the display(s) 110(A) to scroll, pan, zoom in/out, and/or the like to view details associated with the trip.

In some examples, an input associated with the user interface element 308(B) can cause graphical user interface 312 to be presented via the display 110(A), which can enable the passenger 114(A) to control music in the vehicle 100, such as by selecting a channel or station, instructing the vehicle 100 to play, pause, advance forward, or advance backward, and/or controlling the volume of the music. In some examples, the graphical user interface 312 can enable the passenger 114(A) to control music within the entire interior of the vehicle 100. In other examples, the graphical user interface 312 can enable the passenger 114(A) to control sound within a region of the vehicle 100 that the passenger 114(A) is seated. That is, in some examples, the vehicle 100 can be configured with sound systems and/or other emitters to enable directional music or sound to be output within the vehicle 100. In such examples, the passenger 114(A) can interact with the graphical user interface 312 to control ambient music (e.g., music within the region of the vehicle 100 that the passenger 114(A) is seated). In some examples, default settings can be determined based at least in part on user data associated with the passenger 114(A). In some examples, the passenger 114(A) can interact with the graphical user interface 312 to establish a Bluetooth® connection with another computing device (e.g., mobile computing device) to play music from the other computing device via the vehicle 100.

In some examples, an input associated with the user interface element 308(N) can cause graphical user interface 314 to be presented via the display 110(A), which can enable the passenger 114(A) to control temperature via heating, ventilation, and air conditioning (HVAC), such as by controlling temperature and/or air flow. In some examples, the graphical user interface 314 can enable the passenger 114(A) to control temperature within the entire interior of the vehicle 100. In other examples, the graphical user interface 314 can enable the passenger 114(A) to control temperature within a region of the vehicle 100 that the passenger 114(A) is seated. That is, in some examples, the vehicle 100 can be configured with HVAC systems to enable directional HVAC to be output within the vehicle 100. In such examples, the passenger 114(A) can interact with the graphical user interface 314 to control ambient temperature (e.g., temperature within the region of the vehicle 100 that the passenger 114(A) is seated). In some example, default settings can be determined based at least in part on user data associated with the passenger 114(A). In some examples, user interface element(s) associated with the graphical user interface 314 can be oriented based on the orientation of the seat and/or passenger in the seat.

In some examples, the graphical user interface 302 can include additional or alternative user interface elements to enable the passenger 114(A) to access additional or alternative information via the display 110(A). In some examples, the graphical user interface 302 can present information associated with hazards in the environment of the vehicle 100, faults associated with the vehicle 100 (e.g., airbags, restraints, etc.), or the like. In some examples, the passenger 114(A) can access games, movies, or other digital entertainment content for consumption via the display 110(A). In some examples, the passenger 114(A) can access functionality of third-party system(s) that are integrated with a service provider of the vehicle 100. For instance, email functionality, calendar functionality, video calling functionality, or the like can be integrated with the service provider and accessible via the display 110(A). As another example, the passenger 114(A) can access functionality for communicating with a remote operator associated with the service provider, for instance to report a problem or an emergency, request help, or the like. That is, additional or alternative functionality can be accessible via the graphical user interface 302 and/or interactions therewith.

In some examples, techniques described herein enable multiple passengers to interact with their own displays to have their own ride experience. That is, each passenger can be interacting with their own display to view information associated with their trip, to control their music, to control their temperature, and/or the like. In some examples, the display(s) 110(A)-110(N) can present the same or different information for passenger(s) in the vehicle 100 to enable each passenger to interact with the vehicle 100 and/or the service.

Passengers can participate in different types of rides: private rides or shared rides. A private ride can be a ride wherein each of the passengers is associated with a same trip request and/or trip. A shared ride can be a ride wherein two or more passengers are associated with different trip requests and/or trips. In some examples, functionality availed via the graphical user interface 302, or otherwise via the display 110(A), can depend on a type of ride (e.g., private ride vs. shared ride). For example, voice control, music control, HVAC control, and the like may not be available for shared rides but may be available for private rides. When a functionality is disabled or otherwise not available, access to such functionality may not be availed via the graphical user interface 302.

In some examples, based at least in part on a determination that the vehicle 100 is within a predetermined threshold (e.g., distance, time, etc.) from a destination associated with a trip, the content management component 104 can cause the graphical user interface 304 to be presented via the display 110(A). In some examples, the graphical user interface 304 can include the user interface element(s) 308(A)-308(N). In some examples, the user interface element(s) 308(A)-308(N) can be presented in association with each graphical user interface associated with a ride-in-progress state of the vehicle 100.

In some examples, if multiple passengers are in the vehicle 100 and individual of the passengers are associated with different trips (e.g., a shared ride), the content management component 104 can selectively determine which display(s) 110(A)-110(N) to present the graphical user interface 304. For instance, the graphical user interface 304 can be presented on display(s) 110(A)-110(N) corresponding to passenger(s) whose trip is nearing completion at their destination but may not be presented on display(s) 110(A)-110(N) corresponding to passenger(s) whose trip is not nearing completion.

In at least one example, based at least in part on determining that the vehicle 100 transitions from the ride-in-progress state to an arriving state, the content management component 104 can cause the graphical user interface 306 to be presented, which can inform the passenger 114(A) that the vehicle 100 is pulling over. In some examples, as described above, if multiple passengers are in the vehicle 100 and individual of the passengers are associated with different trips, the content management component 104 can selectively determine which display(s) 110(A)-110(N) to present the graphical user interface 306. In other examples, even if multiple passengers are in the vehicle 100 and individual of the passengers are associated with different trips, the content management component 104 can present the graphical user interface 306 on each of the display(s) 110(A)-110(N), or a subset thereof associated with occupied seats, regardless of whether the corresponding passenger(s) are arriving at their destination. That is, in some examples, because the vehicle 100 is performing an operation that affects all passengers, the graphical user interface 306 can be presented via each of the display(s) 110(A)-110(N), or a subset thereof.

The graphical user interfaces 300-314 can be presented in any combination. That is, while shown in a linear progression, in some examples, an interaction with one of the graphical user interfaces 300-314 can cause any one of the other graphical user interfaces 300-314 to be presented. Furthermore, in some examples, individual of the graphical user interfaces 300-314 can be presented in combination with other graphical user interfaces described herein with reference to FIGS. 2 and 4.

FIG. 4 illustrates a plurality of graphical user interfaces that can be presented via a display, such as the display 110(A), associated with a vehicle, such as the vehicle 100, in association with one or more states of the vehicle 100, as described herein. In at least one example, the content management component 104 can determine content to present via the display(s) 110(A)-110(N) based at least in part on a state of the vehicle 100. In FIG. 4, a plurality of graphical user interfaces associated with an egress state are illustrated.

In at least one example, based at least in part on determining that the vehicle 100 is associated with an arriving state (e.g., the vehicle 100 is within a threshold distance of a destination of a trip, an origin of another trip, or the like), the vehicle 100 can transition to an egress state wherein the vehicle computing device(s) 102 can perform one or more operations to prepare the vehicle 100 for at least one passenger to exit (e.g., egress). A graphical user interface 400 can be presented via the display 110(A) to notify the passenger 114(A) that the vehicle 100 has arrived at its destination and that it is safe to exit the vehicle. In at least one example, the graphical user interface 400 can include a user interface element 402 that can be actuated to cause the door(s) of the vehicle 100 to open. That is, based at least in part on receiving an input indicating actuation of the user interface element 402, the content management component 104 can send an indication of such to another component of the vehicle computing device(s) 102, which can cause the door(s) of the vehicle 100 to open.

In at least one example, based at least in part on receiving an input indicating actuation of the user interface element 402, the content management component 104 can cause graphical user interface 404 to be presented via the display 110(A). The graphical user interface 404 can communicate that an operation is being performed (e.g., the door(s) are opening). In at least one example, after the content management component 104 determines that the operation has been performed (e.g., the door(s) have opened), the content management component 104 can cause another graphical user interface 406 to be presented via the display 110(A). In at least one example, the graphical user interface 406 can include a user interface element 408 that can be actuated to cause an operation to be performed (e.g., the door(s) to be closed). The graphical user interface 406 can provide the passenger 114(A) the option to close the doors, for example, if the destination is incorrect, if the external environment is unfavorable, or the like. In such an example, the graphical user interface 406 can present additional or alternative content to enable the passenger 114(A) with additional or alternative options, such as to call a remote service (e.g., teleoperations), update a destination, report a problem (e.g., with the environment, the vehicle 100, etc.), and/or the like.

In some examples, if multiple passengers are in the vehicle 100 and individual of the passengers are associated with different trips (e.g., a shared ride), the content management component 104 can selectively determine which display(s) 110(A)-110(N) to present the graphical user interfaces 400-406. For instance, the graphical user interfaces 400-406 can be presented on display(s) 110(A)-110(N) corresponding to passenger(s) whose trip is complete but may not be presented on display(s) 110(A)-110(N) corresponding to passenger(s) whose trip is not complete.

In some examples, graphical user interface(s) associated with the egress state and/or arrival state can alert a passenger of an item left behind, information associated with the environment, and/or additional or alternative information.

The graphical user interfaces 400-406 can be presented in any combination. That is, while shown in a linear progression, in some examples, an interaction with one of the graphical user interfaces 400-406 can cause any one of the other graphical user interfaces 400-406 to be presented. Furthermore, in some examples, individual of the graphical user interfaces 400-406 can be presented in combination with other graphical user interfaces described above with reference to FIGS. 2 and 3.

Figure 5:
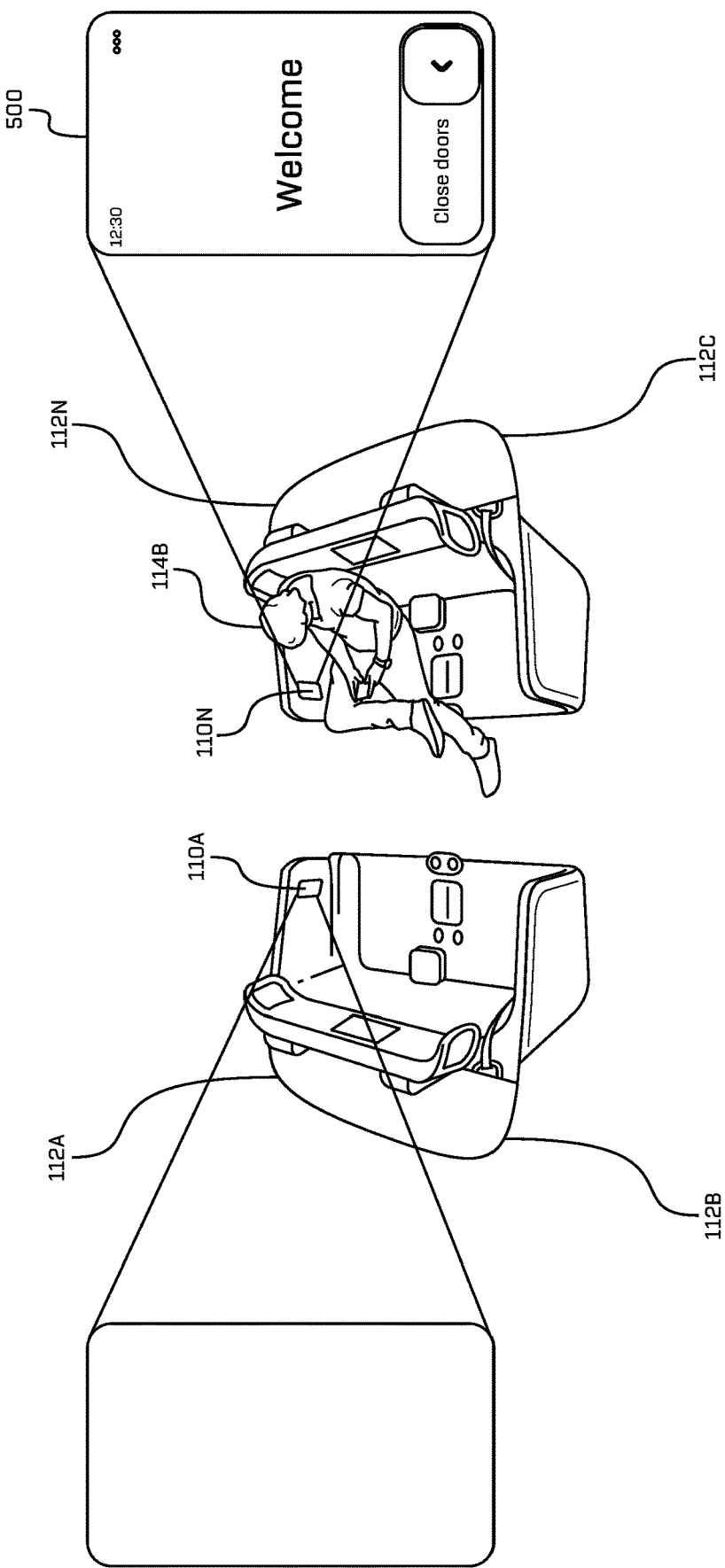
FIG. 5 illustrates an example of two graphical user interfaces presented via two different displays associated with a vehicle that can be used for facilitating multi-passenger interaction, as described herein.

FIG. 5 illustrates an example of two graphical user interfaces presented via two different displays, such as the display 110(A) and the display 110(N), associated with a vehicle, such as the vehicle 100, that can be used for facilitating multi-passenger interaction, as described herein. As described above, in some examples, the content management component 104 can determine content to present via the display(s) 110(A)-110(N) based at least in part on occupancy states associated with individual of the seat(s) 112(A)-112(N) of the vehicle 100. That is, in some examples, the content management component 104 can determine whether to present content via a particular display of the display(s) 110(A)-110(N) based at least in part on occupancy states associated with individual of the seat(s) 112(A)-112(N) corresponding to the display(s) 110(A)-110(N). As illustrated in FIG. 5, a graphical user interface 500 can be presented via the display 110(A), which corresponds to a seat associated with an occupied state. That is, the passenger 114(A) is seated in the seat 112(A) with which the display 110(A) corresponds. As such, the content management component 104 can cause the graphical user interface 500 to be presented via the display 110(A). However, because the seat 112(N) with which the display 110(N) is associated with an unoccupied state (i.e., there is not a passenger in the seat 112(N)), the content management component 104 can refrain from causing content to be presented via the display 110(N). As such, the display 110(N) is shown in FIG. 5 as not presenting a graphical user interface. In some examples, instead of refraining from causing content to be presented via a display corresponding to an unoccupied seat, the content management component 104 can cause (i) different content or (ii) the same content, presented differently, to be presented via such a display. For instance, a graphical user interface presented via a display proximate an unoccupied seat can be less bright, have muted colors, have smaller text, or the like.

While a welcome graphical user interface (e.g., associated with an ingress state) is illustrated in FIG. 5, occupancy data and/or occupancy states can be used to determine subsets of the display(s) 110(A)-110(N) on which graphical user interfaces as described herein can be presented at a particular time.

Figure 6:
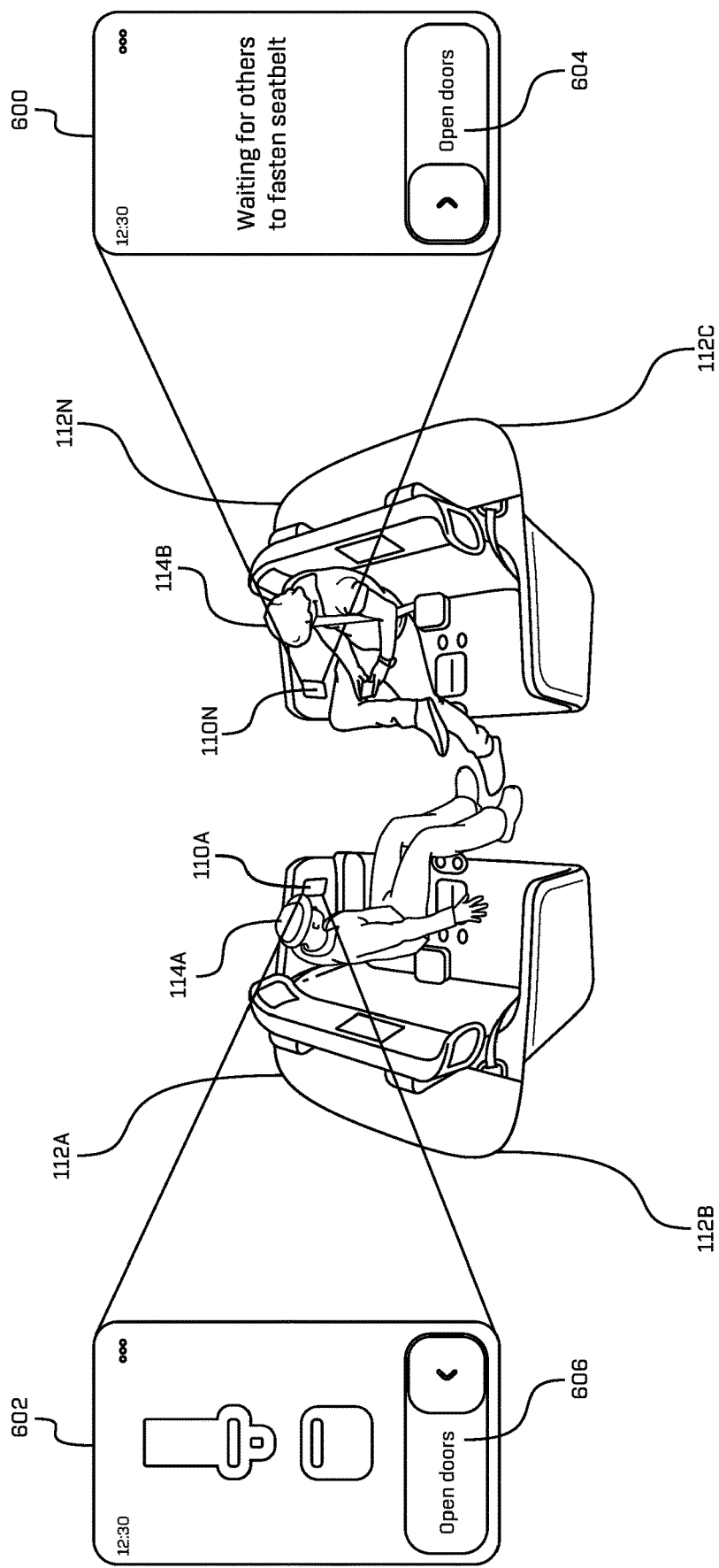
FIG. 6 illustrates another example of two graphical user interfaces presented via two different displays associated with a vehicle that can be used for facilitating multi-passenger interaction, as described herein.

FIG. 6 illustrates another example of two graphical user interfaces presented via two different displays, such as the display 110(A) and the display 110(N), associated with a vehicle, such as the vehicle 100, that can be used for facilitating multi-passenger interaction, as described herein. As described above, in some examples, different display(s) can present different content at the same time. Such content can be determined by the content management component 104. In some examples, content presented via a display can be determined based at least in part on a state of the vehicle 100, vehicle data, trip data, user data, context data, and/or the like.

For instance, as illustrated in FIG. 6, two passengers 114(A) and 114(B) are seated in the vehicle 100. In at least one example, the content management component 104 can receive sensor data from the sensor component(s) 106, which can be used to determine context data. For example, the sensor data can indicate whether each of the passengers 114(A) and 114(B) have fastened their seatbelts. Based at least in part on determining that the passenger 114(B) has fastened its seatbelt and at least one other passenger (e.g., passenger 114(A)) has not yet fastened their seatbelt (e.g., based at least in part on sensor data received from the sensor component(s) 106), the content management component 104 can cause graphical user interface 600 to be presented via the display 110(N). The graphical user interface 600 can indicate that other passenger(s) have not yet fastened their seatbelt(s). That is, the graphical user interface 600 can convey information about another passenger to the passenger 114(B) and can be determined based at least in part on data associated with the other passenger 114(A). Further, based at least in part on determining that the passenger 114(A) has not yet fastened its seatbelt (e.g., based at least in part on sensor data received from the sensor component(s) 106), the content management component 104 can cause graphical user interface 602 to be presented to prompt the passenger 114(A) to fasten their seatbelt. That is, the context data can be used by the content management component 104 to determine different content to be presented via the display 110(A). Both the graphical user interface 600 and the graphical user interface 602 can include a user interface element 604 and 606, respectively, that when actuated, can cause the vehicle computing device(s) 102 to perform an operation, such as opening the door(s).

In at least one example, the content presented via the graphical user interfaces 600 and 602 can be presented based at least in part on a position and/or location of a display in the vehicle 100. That is, in some examples, the content can be oriented so that user input is provided in a same direction that an operation is performed. As an example, if a door opens left to right relative to a passenger, a user interface element, such as the user interface element 604, can be positioned such that, to cause the door to open, a left to right gesture can be input to the graphical user interface 600. However, if a door opens right to left relative to a passenger, a user interface element, such as the user interface element 606, can be positioned such that, to cause the door to open, a right to left gesture can be input to the graphical user interface 602. The user interface elements 604 and 606 are oriented based at least in part on a position and/or location of the display 110(N) and 110(A) in the vehicle 100.

Figure 7:
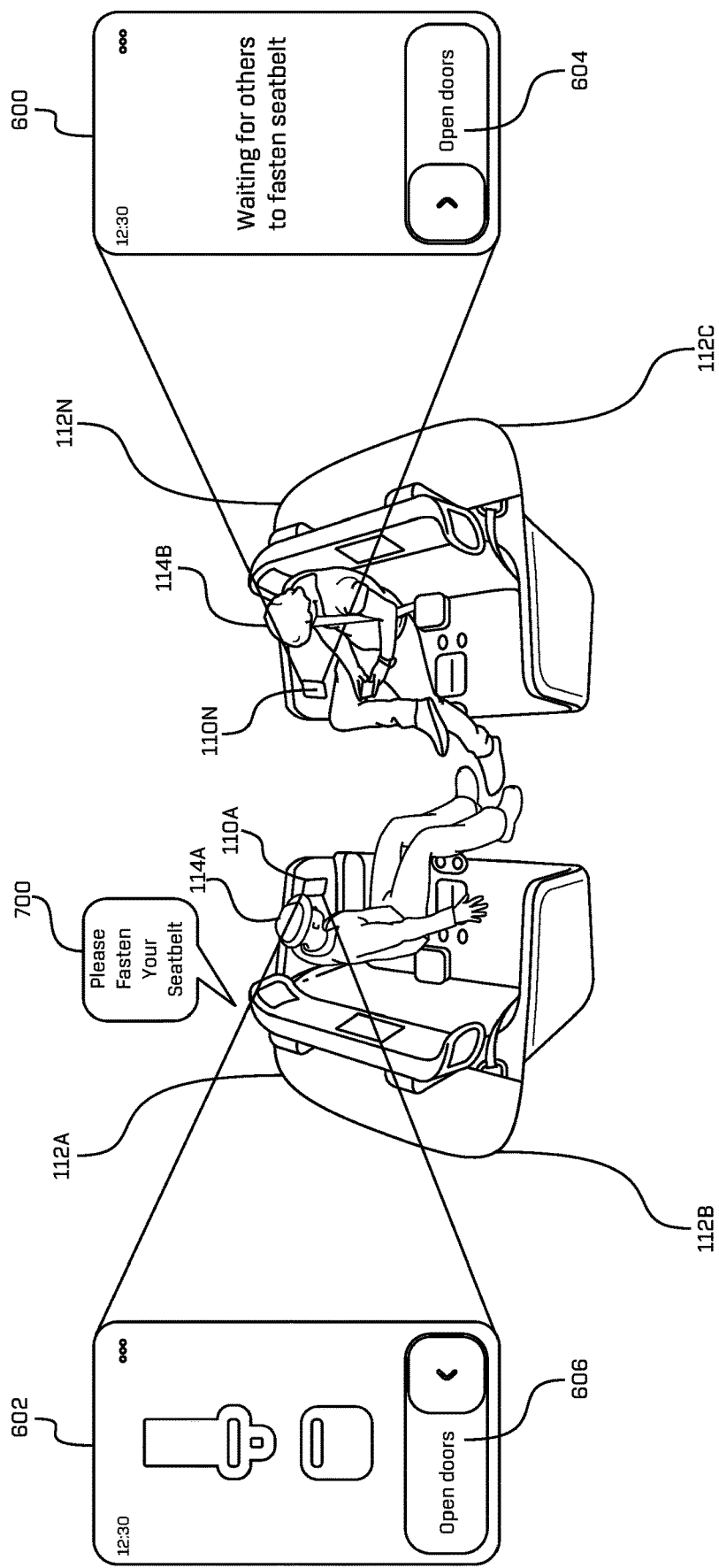
FIG. 7 illustrates yet another example of two graphical user interfaces presented via two different displays associated with a vehicle that can be used for facilitating multi-passenger interaction, as described herein.

FIG. 7 illustrates yet another example of two graphical user interfaces presented via two different displays, such as the display 110(A) and the display 110(N), associated with a vehicle, such as the vehicle 100, that can be used for facilitating multi-passenger interaction, as described herein. The graphical user interfaces shown in FIG. 7 are the same graphical user interfaces 600 and 602 of FIG. 6 but could be any graphical user interface described herein or otherwise.

In some examples, the content management component 104 can determine how content is presented based at least in part on user data associated with a passenger. In some examples, the content management component 104 can determine an identity of a passenger based at least in part on data associated with a trip request. For example, a trip request, which can be received from a computing device of a passenger (e.g., a to-be passenger), can include an identifier associated with the passenger. Such an identifier can include, but is not limited to, a device identifier associated with the computing device of the passenger, an account identifier associated with the passenger, an email address associated with the passenger, a phone number associated with the passenger, or the like. In at least one example, the content management component 104 can determine whether the identifier is mapped to, or otherwise associated with, a profile or other stored data. Based at least in part on determining that the identifier is mapped to, or otherwise associated with, a profile or other stored data, the content management component 104 can access user data associated with the profile or other stored data. In some examples, the user data can indicate preferences of the passenger (e.g., music preference, temperature preference, presentation characteristic preference, etc.), abilities or disabilities of the passenger (e.g., a hearing impairment, a visual impairment, a physical impairment, etc.), a classification of the passenger (e.g., an adult, a child, etc.), or the like. In at least one example, such user data can be used to determine what content to present and/or how content is to be presented.

In an additional or alternative example, the sensor component(s) 106 can include a biometric identification system and/or a camera that can be used to determine an identity of a passenger. In at least one example, the content management component 104 can determine whether the identity is mapped to, or otherwise associated with, a profile or other stored data. Based at least in part on determining that the identity is mapped to, or otherwise associated with, a profile or other stored data, the content management component 104 can access user data associated with the profile or other stored data. In at least one example, such user data can be used to determine what content to present and/or how content is to be presented.

As described above, the content management component 104 can determine user data associated with the passenger 114(A). As an example, in FIG. 7, the user data can indicate that the passenger 114(A) has a visual impairment. As such, the content management component 104 can cause content associated with the graphical user interface 602 to additionally, or alternatively, be output via a user interface other than a graphical user interface, such as a speaker. That is, in FIG. 7, a spoken output 700 is illustrated to convey content associated with the graphical user interface 602 to the passenger 114(A).

As illustrated in FIG. 7, in some examples, user data can determine an output mechanism in which content can be presented (e.g., graphical user interface, speaker user interface, haptic user interface, etc.). In some examples, user data can be used to determine a presentation characteristic associated with content presented via a graphical user interface. For example, the size of user interface elements, the configuration of user interface elements, colors associated with user interface elements, and/or the like can be determined based at least in part on user data as described above. Furthermore, in some examples, user data can indicate whether or how to route communications between passengers (e.g., displays associated therewith). For example, if user data indicates that a passenger is a child, the content management component 104 may determine to route communication to a different passenger that is an adult. As such, instead of, or in addition to, presenting content to the child via a respective display, the content management component 104 can cause content relating to the child to be presented via a display of the adult.

Figure 8A:
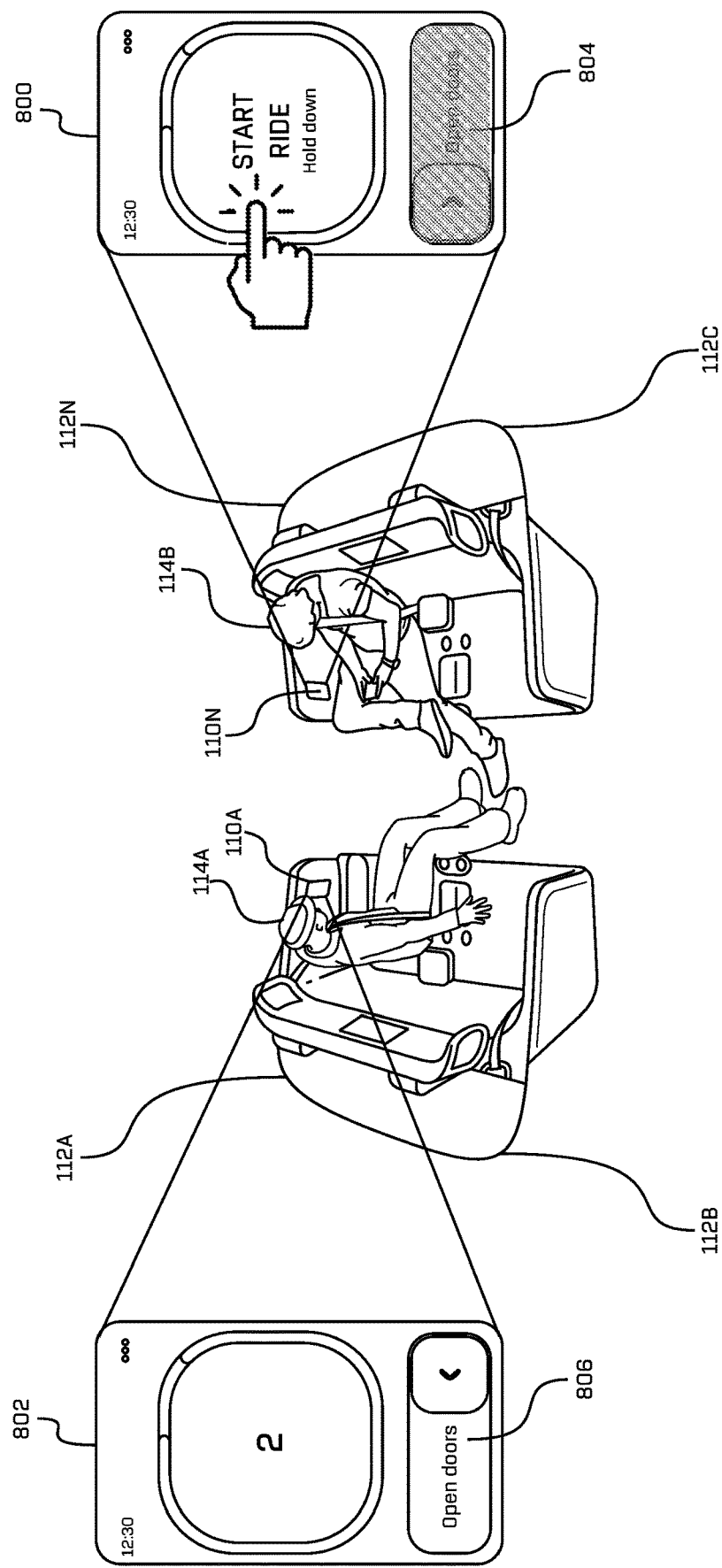
FIGS. 8A and 8B illustrate an example of two graphical user interfaces presented via two different displays associated with a vehicle that can be used for facilitating multi-passenger interaction, as described herein.
Figure 8B:
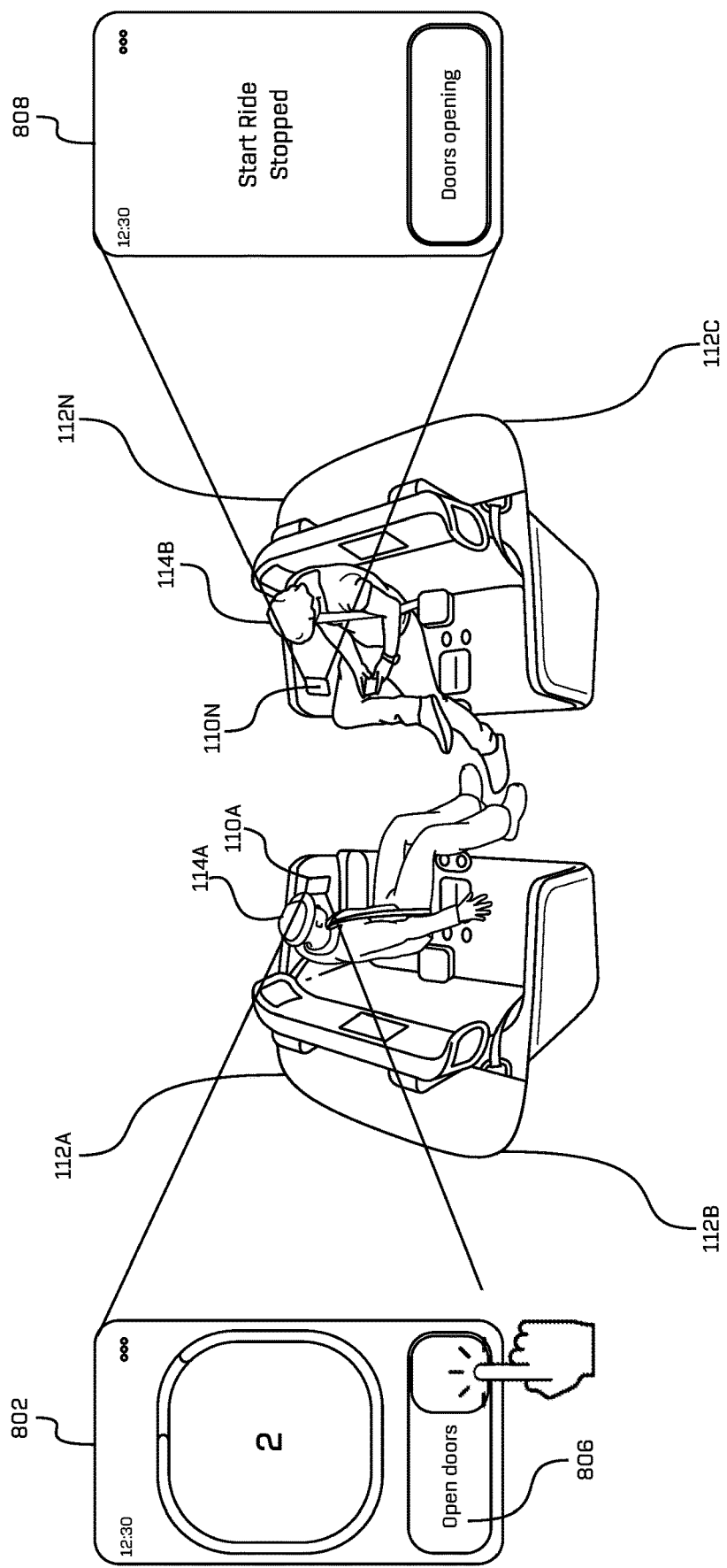

FIGS. 8A and 8B illustrate an example of two graphical user interfaces presented via two different displays, such as the display 110(A) and the display 110(N), associated with a vehicle, such as the vehicle 100, that can be used for facilitating multi-passenger interaction, as described herein. In some examples, a graphical user interface that can be presented via the display(s) 110(A)-110(N) can be a passive graphical user interface that is providing information to the passenger(s) 114(A) and 114(B). In some examples, a graphical user interface can be active such that it can prompt a passenger for input and/or can require input to enable a functionality and/or cease presentation. The graphical user interface 800, which is the same graphical user interface 212 of FIG. 2, can prompt the passenger 114(B) to provide an input to "start a ride" (e.g., cause the vehicle 100 to begin moving). In at least one example, based at least in part on the passenger 114(B) interacting with the graphical user interface 800, the content management component 104 can determine content to be presented via the display 110(A) associated with the passenger 114(A) and can cause graphical user interface 802 to be presented via the display 110(A). In at least one example, the graphical user interface 802 can indicate that the other passenger 114(B) is interacting with the graphical user interface 800.

In at least one example, the graphical user interfaces 800 and 802 can include a user interface element 804 and 806, respectively, to enable the passenger(s) 114(B) and 114(A), respectively, to cause the vehicle 100 to perform an operation (e.g., open the door(s)). In some examples, an interaction with one of the user interface elements 804 or 806 can override the input to the graphical user interface 800. That is, in some examples, the passenger 114(A) can interact with the user interface element 806 to override, modify, and/or supplement the input (by the passenger 114(B)) via the display 110(N). That is, even though the passenger 114(B) is providing an input requesting to start the ride, in some examples, the passenger 114(A) can interact with the user interface element 806 to stop the ride from starting and/or to perform another operation (e.g., open the door(s) of the vehicle 100). In at least one example, the content management component 104 can access one or more rules that can indicate relationships between inputs, such as which inputs override other inputs, and the like.

As illustrated in FIG. 8B, the passenger 114(A) can provide an input to the graphical user interface 802 by interacting with the user interface element 806 to cause the vehicle 100 to open the doors. Based at least in part on receiving such input, the content management component 104 can determine updated content to be presented via the display 110(N). As such the content management component 104 can cause graphical user interface 808 to be presented via the display 110(N), which indicates that the previous operation (e.g., start ride) has been stopped and that the doors are opening. That is, the input provided by the passenger 114(A) can override the previous input provided by the passenger 114(B). In some examples, the graphical user interface 808 can be presented via each of the display(s) 110(A)-110(N). In at least one example, based at least in part on receiving the input associated with the user interface element 806, the content management component 104 can send an indication of such to other component(s) of the vehicle computing device(s) 102 to cause relevant operation(s) to be performed (e.g., the vehicle 100 to stop moving and/or the doors to open).

Figure 9A:
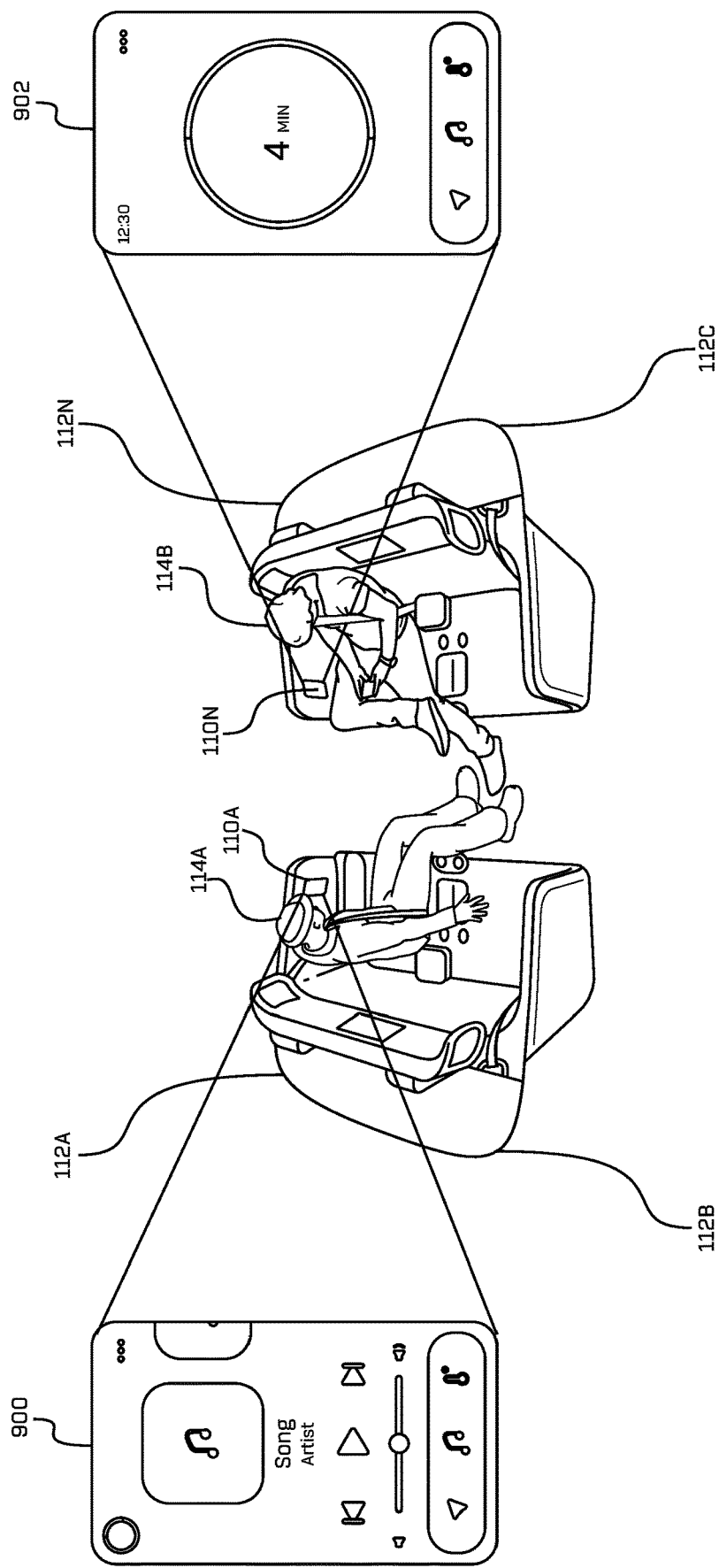
FIGS. 9A and 9B illustrate an example of two graphical user interfaces presented via two different displays associated with a vehicle that can be used for facilitating multi-passenger interaction, as described herein.
Figure 9B:
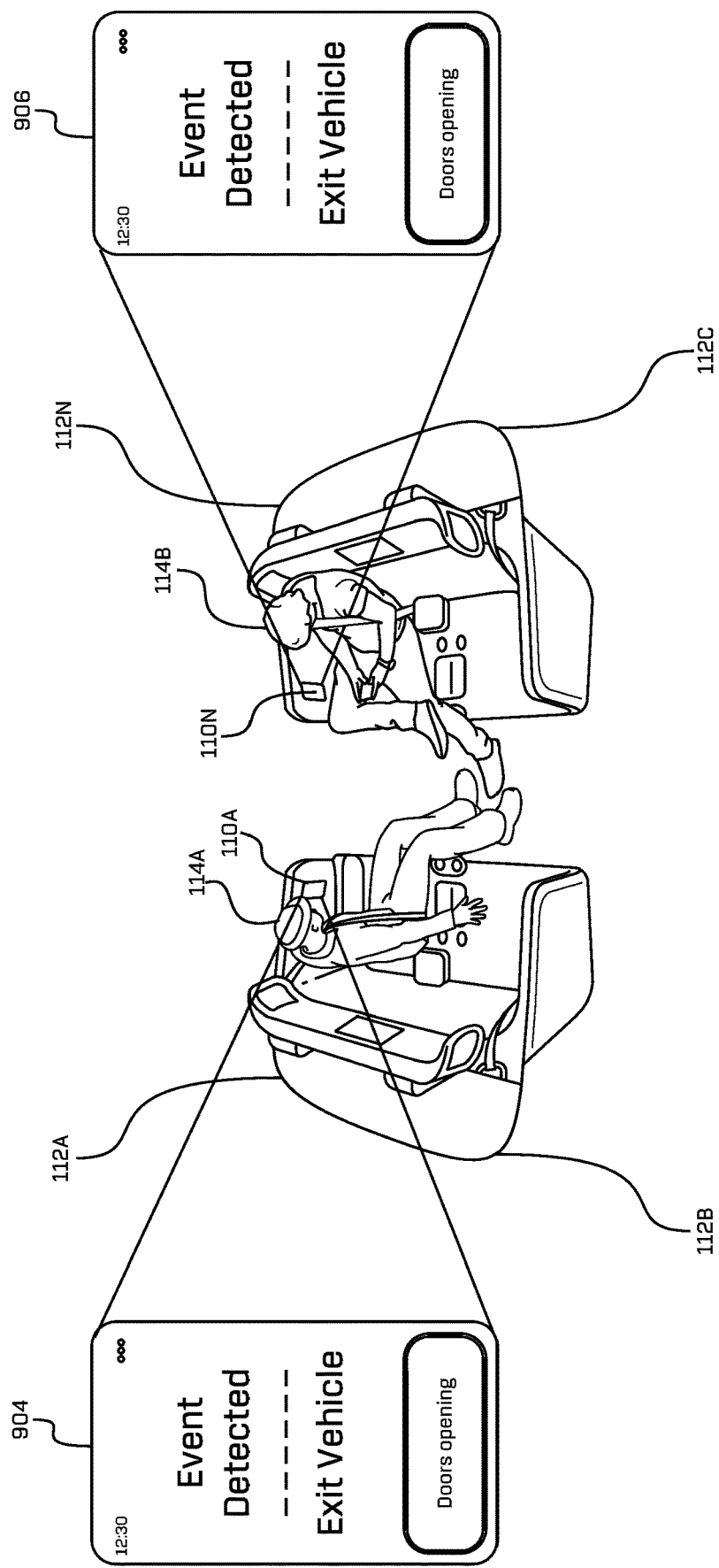

FIGS. 9A and 9B illustrate an example of two graphical user interfaces presented via two different displays, such as the display 110(A) and 110(N), associated with a vehicle, such as the vehicle 100, that can be used for facilitating multi-passenger interaction, as described herein. In some examples, the content management component 104 can determine an occurrence of an event that can cause a user interface element and/or graphical user interface to take over current graphical user interface(s) being presented via the display(s) 110(A)-110(N). An example of such an event may include an emergency, a default of the vehicle 100 and/or a component of the vehicle 100, a sudden stop, or the like. In FIG. 9A, each display 110(A) and 110(N) is presenting a graphical user interface 900 and 902, respectively, that is relevant for the corresponding passenger 114(A) and 114(B). In at least one example, based at least in part on determining an occurrence of an event, the content management component 104 can cause other graphical user interfaces 904 and 906 to be presented instead of the graphical user interfaces 900 and 902, as illustrated in FIG. 9B. That is, the graphical user interfaces 904 and 906 can take over the graphical user interfaces 900 and 902. In some examples, such graphical user interfaces 904 and 906 can include an instruction for the passengers 114(A) and 114(B). In some examples, instead of a new graphical user interface, a user interface element can be presented as a pop-up, overlay, or the like to notify the passengers 114(A) and 114(B) of the event. In some examples, a take over graphical user interface can be presented to alert a passenger of a fault with the vehicle 100 (e.g., airbag is deactivated, seatbelt is broken, etc.) and/or to provide instructions to the passenger (e.g., sit in a particular seat, etc.).

The graphical user interfaces described above with reference to FIGS. 1-9 are provided for illustrative purposes. In some examples, additional or alternative content can be presented via the graphical user interfaces. In some examples, content can be presented in additional or alternative presentations. For example, graphical user interfaces and/or user interface elements can be associated with different presentation characteristics, which can cause changes to how content is presented. Presentation characteristics can include, but are not limited to, surface area of display occupied, placement, timing, brightness, color, size, or the like. In some examples, presentation characteristics can be determined based at least in part on user data, as described above.

In some examples, the graphical user interfaces described above can be presented as full screen graphical user interfaces as illustrated above. In some examples, content associated with the graphical user interfaces can be presented as user interface elements that can be presented as pop-ups, overlays, and/or components of a full screen graphical user interface. As described above, in some examples, content presented via the graphical user interfaces can be passive (e.g., presenting information without limiting interactions and/or otherwise requiring an action, is dismissible, times out, etc.) or active (e.g., limiting interaction and/or otherwise requiring an action before it is dismissed). In some examples, some content can be presented via a full screen graphical user interface in association with one or more other actions (e.g., silencing of music, internal lights turning on or increasing in brightness, etc.). In some examples, such a message may not be dismissible.

Figure 10:
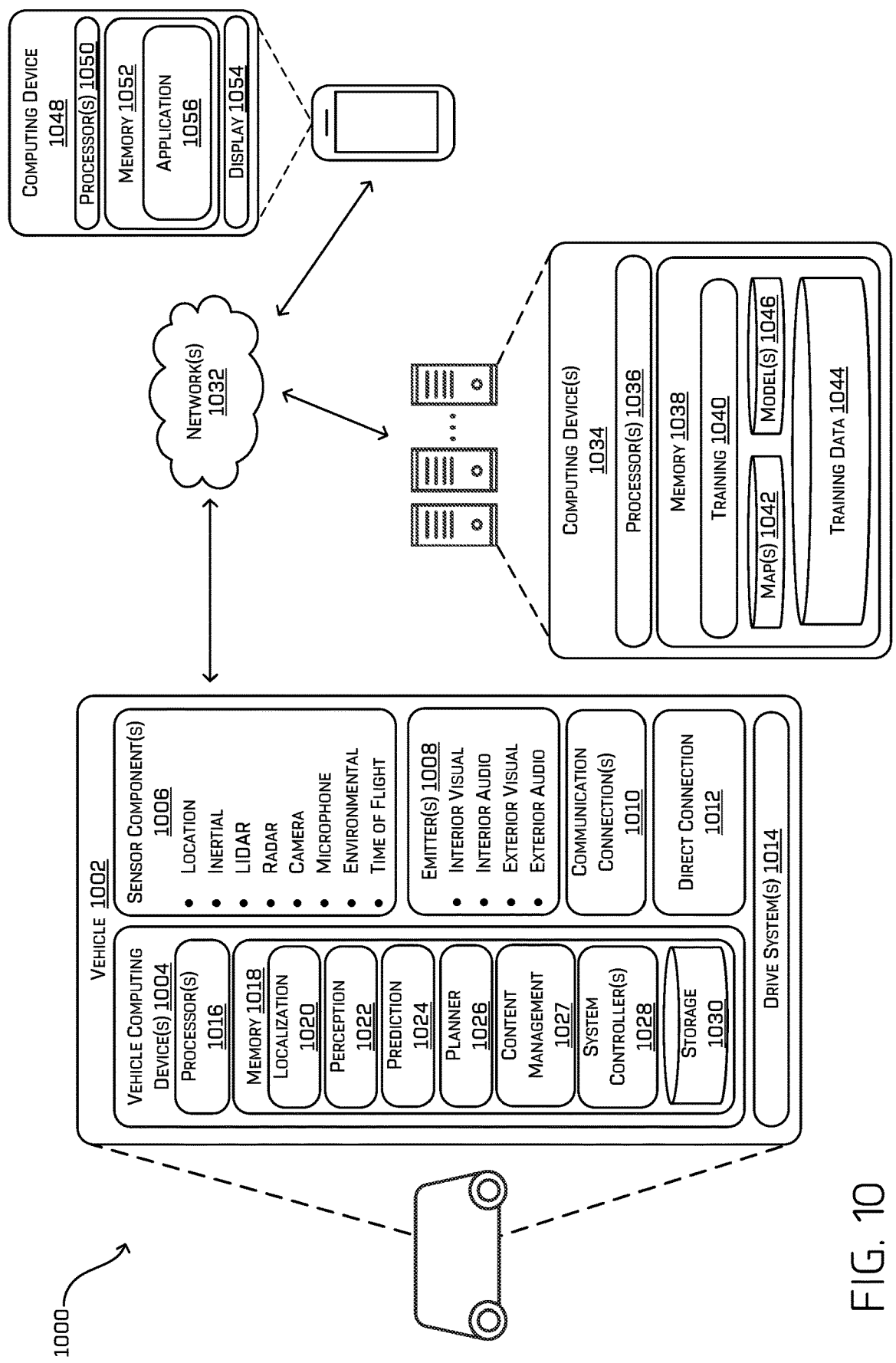
FIG. 10 is a block diagram illustrating an example system for performing techniques, as described herein.

FIG. 10 is a block diagram illustrating an example system 1000 for performing techniques, as described herein. In at least one example, a vehicle 1002 can include one or more vehicle computing devices 1004, one or more sensor components 1006, one or more emitters 1008, one or more communication connections 1010, at least one direct connection 1012, and one or more drive systems 1014. In at least one example, a vehicle 1002 can correspond to the vehicle 100 described above with reference to FIG. 1. In some examples, the vehicle 1002 is an autonomous vehicle, as described above with reference to FIG. 1; however, the vehicle 1002 could be any other type of vehicle. While only a single vehicle 1002 is illustrated in FIG. 10, in a practical application, the example system 1000 can include a plurality of vehicles, which, in some examples, can comprise a fleet of vehicles.

The vehicle computing device(s) 1004, which can correspond to the vehicle computing device(s) 102 described above with reference to FIG. 1, can include processor(s) 1016 and memory 1018 communicatively coupled with the processor(s) 1016. In the illustrated example, the memory 1018 of the vehicle computing device(s) 1004 stores a localization component 1020, a perception component 1022, a prediction component 1024, a planner component 1026, a content management component 1027, and one or more system controllers 1028. Additionally, the memory 1018 can include a storage 1030, which can store map(s), model(s), rule(s), etc. A map can be any number of data structures that are capable of providing data about an environment, such as, but not limited to, topologies (such as junctions, lanes, merging zones, etc.), streets, mountain ranges, roads, terrain, and the environment in general. Maps can be associated with real environments or simulated environments. Model(s) can include machine-trained models, as described below. In some examples, the storage 1030 can store rule(s) for resolving conflicts between inputs and/or the like.

In at least one example, the localization component 1020 can determine a pose (position and orientation) of the vehicle 1002 in relation to a local and/or global map based at least in part on sensor data received from the sensor component(s) 1006 and/or map data associated with a map (e.g., of the map(s)). In at least one example, the localization component 1020 can include, or be associated with, a calibration component that is capable of performing operations for calibrating (determining various intrinsic and extrinsic parameters associated with any one or more of the sensor component(s) 1006), localizing, and mapping substantially simultaneously.

In at least one example, the perception component 1022 can perform object detection, segmentation, and/or classification based at least in part on sensor data received from the sensor component(s) 1006. In at least one example, the perception component 1022 can receive raw sensor data (e.g., from the sensor component(s) 1006). In at least one example, the perception component 1022 can receive sensor data and can utilize one or more processing algorithms to perform object detection, segmentation, and/or classification with respect to object(s) identified in the sensor data. In some examples, the perception component 1022 can associate a bounding region (or otherwise an instance segmentation) with an identified object and can associate a confidence score associated with a classification of the identified object with the identified object. In some examples, objects, when rendered via a display, can be colored based on their perceived class.

The prediction component 1024 can receive sensor data from the sensor component(s) 1006, map data associated with a map (e.g., of the map(s) which can be in storage 1030), and/or perception data output from the perception component 1022 (e.g., processed sensor data), and can output predictions associated with one or more objects within the environment of the vehicle 1002. In at least one example, the planner component 1026 can determine outputs, to use to control the vehicle 1002 based at least in part on sensor data received from the sensor component(s) 1006, map data, and/or any determinations made by the other components of the vehicle 1002.

Additional details of localization components, perception components, prediction components, and/or planner components that are usable can be found in U.S. Pat. No. 9,612,123, issued on Apr. 6, 2017, and U.S. Pat. No. 10,353,390, issued on Jul. 16, 2019, the entire contents of both of which are incorporated by reference herein. In some examples (e.g., where the vehicle 1002 is not an autonomous vehicle), one or more of the aforementioned components can be omitted from the vehicle 1002. While the components described above are illustrated as "onboard" the vehicle 1002, in other implementations, the components can be remotely located and/or accessible to the vehicle 1002. Furthermore, while the components are described above as "components," such components can comprise one or more components, which can be part of a system, for performing operations attributed to each of the components.

In at least one example, the content management component 1027, which can correspond with the content management component 104 described above with reference to FIG. 1, can determine and/or manage content to be output via the emitter(s) 1008. In some examples, as described above, the emitter(s) 1008 can include display(s) that, in some examples, can be disposed proximate seats of the vehicle 1002. The content management component 1027 can perform operations as described above and below.

In at least one example, the localization component 1020, the perception component 1022, the prediction component 1024, the planner component 1026, and/or the content management component 1027 can process sensor data and can send their respective outputs over network(s) 1032, to computing device(s) 1034. In at least one example, the localization component 1020, the perception component 1022, the prediction component 1024, the planner component 1026, and/or the content management component 1027 can send their respective outputs to the computing device(s) 1034 at a particular frequency, after a lapse of a predetermined period of time, in near real-time, etc.

In at least one example, the vehicle computing device(s) 1004 can include one or more system controllers 1028, which can be configured to control steering, propulsion, braking, safety, emitters, communication, and other systems of the vehicle 1002. These system controller(s) 1028 can communicate with and/or control corresponding systems of the drive system(s) 1014 and/or other systems of the vehicle 1002.

In at least one example, the sensor component(s) 1006, which can correspond to the sensor component(s) 106 described above with reference to FIG. 1, can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, seat sensors, seatbelt sensors, weight sensors, etc. The sensor component(s) 1006 can provide input to the vehicle computing device(s) 1004. In some examples, the sensor component(s) 1006 can preprocess at least some of the sensor data prior to sending the sensor data to the vehicle computing device(s) 1004. In at least one example, the sensor component(s) 1006 can send sensor data, via the network(s) 1032, to the computing device(s) 1034 at a particular frequency, after a lapse of a predetermined period of time, in near real-time, etc.

The vehicle 1002 can also include one or more emitters 1008, which can correspond to the emitter(s) 108 described above with reference to FIG. 1, for emitting light and/or sound, as described above. The emitter(s) 1008 in this example include interior audio and visual emitters (e.g., display(s), speaker(s), optic(s), etc.) to communicate with passengers of the vehicle 1002. By way of example and not limitation, interior emitters can include speakers, lights, optics, signs, display screens, touch screens, haptic emitters (e.g., vibration and/or force feedback), mechanical actuators (e.g., seatbelt tensioners, seat positioners, headrest positioners, etc.), and the like. The emitter(s) 1008 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., one or more optic emitters, etc. In at least one example, the emitter(s) 1008 can be positioned at various locations about the exterior and/or interior of the vehicle 1002.

The vehicle 1002 can also include communication connection(s) 1010 that enable communication between the vehicle 1002 and other local or remote computing device(s). For instance, the communication connection(s) 1010 can facilitate communication with other local computing device(s) on the vehicle 1002 and/or the drive system(s) 1014. Also, the communication connection(s) 1010 can allow the vehicle to communicate with other nearby computing device(s) (e.g., other nearby vehicles, traffic signals, etc.). The communications connection(s) 1010 also enable the vehicle 1002 to communicate with a remote teleoperations computing device or other remote services.

The communications connection(s) 1010 can include physical and/or logical interfaces for connecting the vehicle computing device(s) 1004 to another computing device or a network, such as network(s) 1032. For example, the communications connection(s) 1010 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 1012 can directly connect the drive system(s) 1014 and other systems of the vehicle 1002.

In at least one example, the vehicle 1002 can include drive system(s) 1014. In some examples, the vehicle 1002 can have a single drive system 1014. In at least one example, if the vehicle 1002 has multiple drive systems 1014, individual drive systems 1014 can be positioned on opposite ends of the vehicle 1002 (e.g., the front and the rear, etc.). In at least one example, the drive system(s) 1014 can include sensor component(s) to detect conditions of the drive system(s) 1014 and/or the surroundings of the vehicle 1002. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 1014. In some cases, the sensor component(s) on the drive system(s) 1014 can overlap or supplement corresponding systems of the vehicle 1002 (e.g., sensor component(s) 1006).

The drive system(s) 1014 can include many of the vehicle systems, including a high voltage battery, a motor to propel the vehicle 1002, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1014 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 1014. Furthermore, the drive system(s) 1014 also include communication connection(s) that enable communication by the respective drive system with other local or remote computing device(s).

In FIG. 10, the vehicle computing device(s) 1004, sensor component(s) 1006, emitter(s) 1008, and the communication connection(s) 1010 are shown onboard the vehicle 1002. However, in some examples, the vehicle computing device(s) 1004, sensor component(s) 1006, emitter(s) 1008, and the communication connection(s) 1010 can be implemented outside of an actual vehicle (i.e., not onboard the vehicle 1002). Furthermore, in some examples, aspects of the vehicle computing device(s) 1004 can be distributed within the vehicle and/or other computing device(s) 1034.

As described above, the vehicle 1002 can send sensor data to the computing device(s) 1034, via the network(s) 1032. In some examples, the vehicle 1002 can send raw sensor data to the computing device(s) 1034. In other examples, the vehicle 1002 can send processed sensor data and/or representations of sensor data to the computing device(s) 1034 (e.g., data output from the localization component 1020, the perception component 1022, the prediction component 1024, and/or the planner component 1026). In some examples, the vehicle 1002 can send sensor data to the computing device(s) 1034 at a particular frequency, after a lapse of a predetermined period of time, in near real-time, etc.

The computing device(s) 1034 can receive the sensor data (raw or processed) from the vehicle 1002 and/or other data collection devices, as well as data from one or more third party sources and/or systems. In at least one example, the computing device(s) 1034 can include processor(s) 1036 and memory 1038 communicatively coupled with the processor(s) 1036. In the illustrated example, the memory 1038 of the computing device(s) 1034 stores a training component 1040, a map(s) 1042 (e.g., storing one or more maps), training data 1044 (e.g., storing training data accessible to the training component 1040), and model(s) 1046 (e.g., models output by the training component 1040). In some examples, one or more of the systems and/or storage repositories can be associated with the vehicle 1002 or other computing device(s) associated with the system 1000 instead of, or in addition to, being associated with the memory 1038 of the computing device(s) 1034.

In at least one example, the training component 1040 can train model(s) based at least in part on the training data, which can be used for various operations as described herein. For example, the training component 1040 can train model(s), using machine learning algorithms, that can be used by the content management component 1027 for determining particular content to present via the emitter(s) 1008, for example. Such machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc. In at least one example, the resulting model(s) can be stored in the model(s) 1046 and/or the storage 1030 on the vehicle 1002 and can be accessed in near real-time by one or more components of the vehicle computing device(s) 1004.

In at least one example, the system 1000 can include a computing device 148 of a passenger (or passenger to-be), which can include processor(s) 1050, memory 1052, and a display 1054. In at least one example, the computing device 1048 can comprise a phone, tablet, laptop, wearable, or any other computing device capable of being operated by a passenger. In at least one example, the computing device 1048 of a passenger can be associated with an application 1056 that enables a passenger (or passenger to-be) to request transportation services from a service provider associated with the vehicle 1002 and the computing device(s) 1034. In at least one example, the application 1056 can store and/or have access to user data. For instance, such user data can include a name of the passenger, demographic information associated with the passenger (e.g., birthdate, age, gender, home address, work address, occupation, etc.), an identifier associated with the passenger and/or computing device 1048, biometric information associated with a passenger (e.g., photo, fingerprint(s), retinal scan, ear shape, etc.), a rating associated with the passenger, preferences of the passenger, abilities and/or disabilities of the passenger, a classification of the passenger (e.g., adult, child, etc.), etc. Furthermore, in some examples, the computing device(s) 1034 can send information associated with a trip (e.g., trip information) to the computing device 1048 of the passenger. For instance, the computing device(s) 1034 can send an estimated time of pick-up, an estimated time of arrival at the intended destination (e.g., drop-off location), identification information associated with the vehicle 1002, and/or a trip identifier associated with a trip of a passenger to the computing device 1048 of the passenger. The application 1056 can store the information, at least temporarily, and at least some of the trip information can be presented to the passenger (e.g., via a graphical user interface of the application 1056 and/or the vehicle 1002).

In some examples, the computing device 1048 can pair with the vehicle computing device(s) 1004 to enable the content to be presented via the display 1054 of the computing device 1048 instead of, or in addition to, the display(s) described above (e.g., the emitter(s) 1008 of FIG. 10). That is, in some examples, the content management component 1027 can send content and/or instructions associated therewith to the application 1056 and the application 1056 can cause the content to be output via the display 1054. The application 1056 can detect input associated with the display 1054 and can send an indication of such input to the content management component 1027. In some examples, such communications can be exchanged directly between the computing device 1048 and the vehicle computing device(s) 1004 (e.g., via the network(s) 1032) and/or between the computing device 1048, the computing device(s) 1034, and the vehicle computing device(s) 1004 (e.g., via the network(s) 1032).

The processor(s) 1016 of the vehicle 1002, the processor(s) 1036 of the computing device(s) 1034, and the processor(s) 1050 of the computing device 1048 can be any suitable processor capable of executing instructions to process data and perform operations as described herein. By way of example and not limitation, the processor(s) 1016, 1036, and 1050 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 1018, 1038, and 1052 are examples of non-transitory computer-readable media. Memory 1018, 1038, and 1052 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing data. The architectures, systems, and individual elements described herein can include many other logical, programmatic, and physical components, of which those shown in the accompanying figures are merely examples that are related to the discussion herein.

It should be noted that while FIG. 10 is illustrated as a distributed system, in some examples, components of the vehicle 1002 can be associated with the computing device(s) 1034 and/or the components of the computing device(s) 1034 can be associated with the vehicle 1002. That is, the vehicle 1002 can perform one or more of the functions associated with the computing device(s) 1034, and vice versa.

Furthermore, while the vehicle computing device(s) 1004 and the computing device(s) 1034 are shown to include multiple components, in some examples, such components can be associated with more or fewer individual components. For example, in an example, a localization component, a perception component, a prediction component, and/or a planner component can be combined into a single component. Or, an annotation component, a training data generation component, and/or a training component can be combined into a single component. That is, while depicted as separate components, any one or more of the components can be combined.

Figure 11:
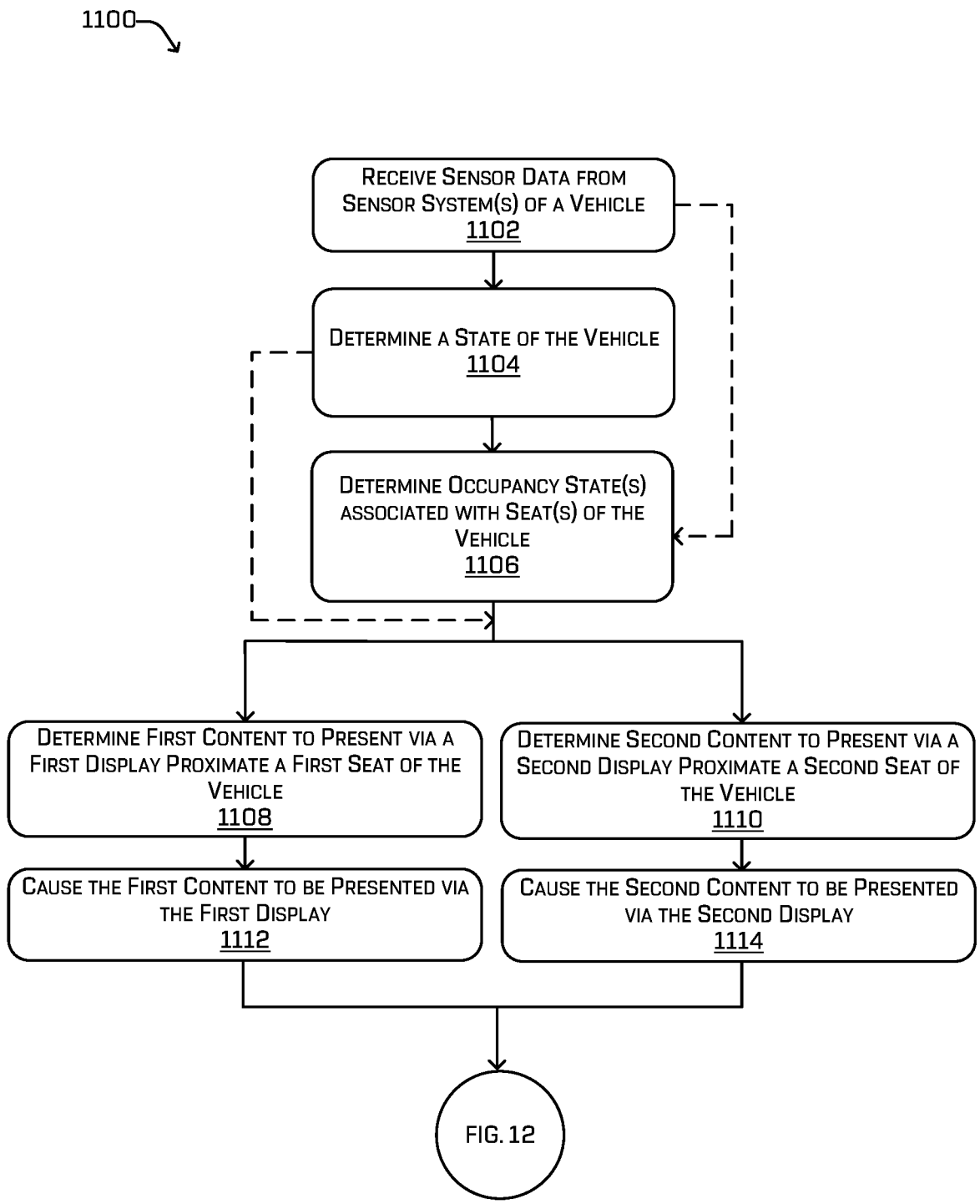
FIG. 11 illustrates an example process for determining content to be presented via display(s) of a vehicle to facilitate multi-passenger interaction, as described herein.
Figure 12:
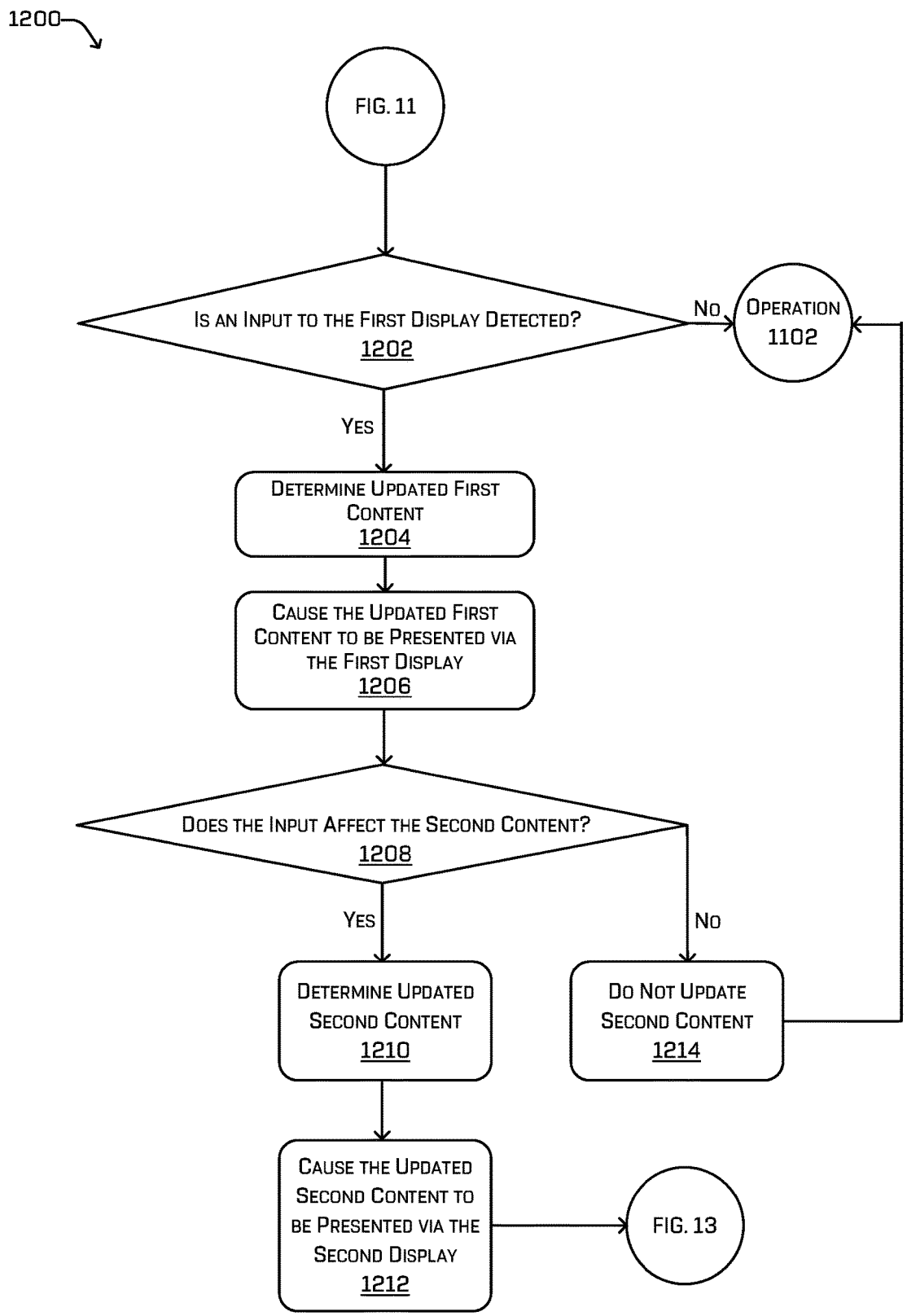
FIG. 12 illustrates an example process for determining whether to update content to be presented via the display(s) of the vehicle based at least in part on determining an input is received via one of the display(s), as described herein.
Figure 13:
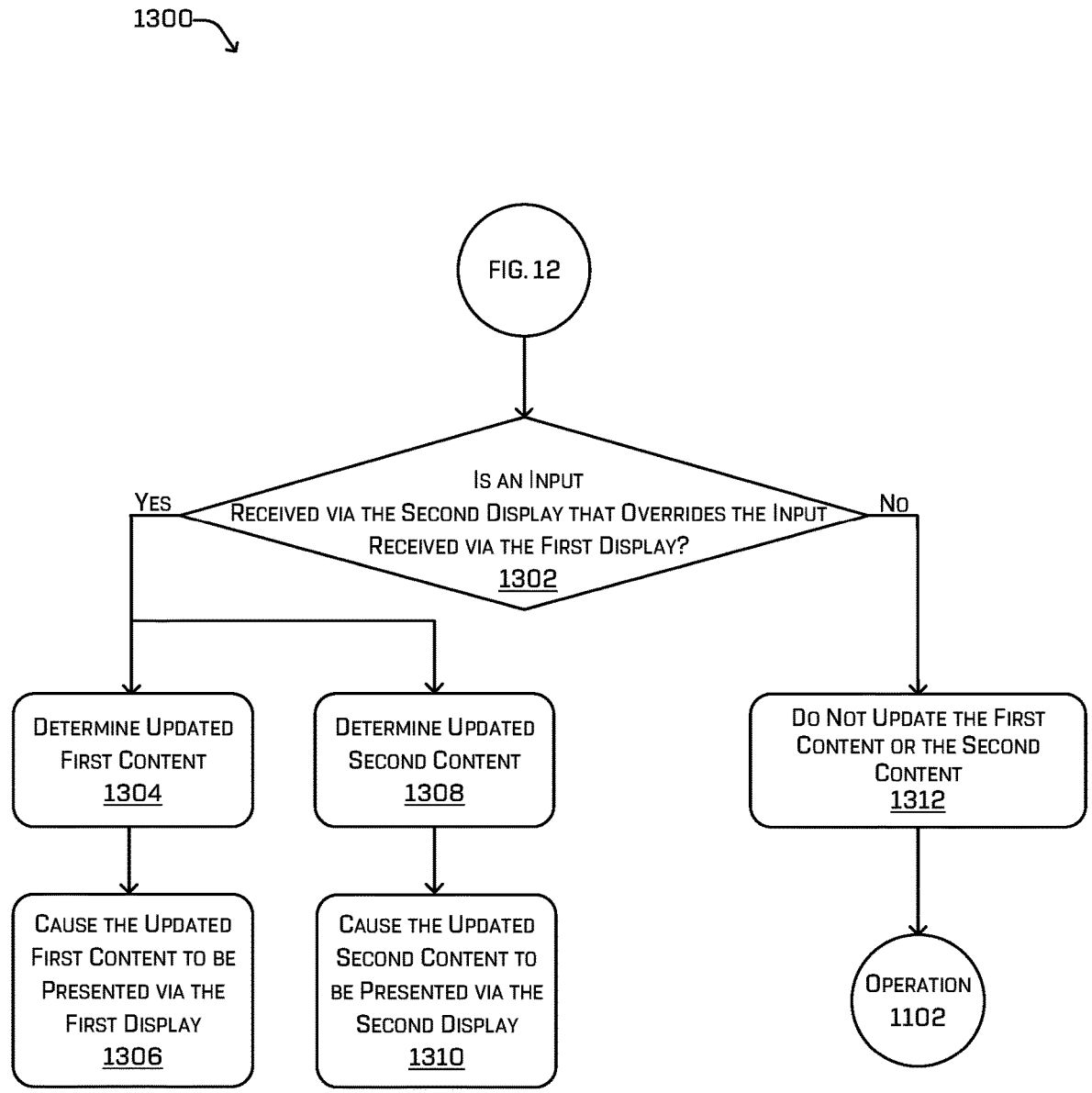
FIG. 13 illustrates an example process for determining whether to update content to be presented via the display(s) of the vehicle based at least in part on determining whether an override input is received via one of the display(s), as described herein.

FIGS. 11-13 are flowcharts showing example processes involving techniques as described herein. The processes illustrated in FIGS. 11-13 are described with reference to the system 1000 shown in FIG. 10 for convenience and ease of understanding. However, the processes illustrated in FIGS. 11-13 are not limited to being performed using the system 1000. Moreover, the system 1000 described herein is not limited to performing the processes illustrated in FIGS. 11-13.

The processes 1100-1300 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 1100-1300 can be combined in whole or in part with each other or with other processes.

FIG. 11 illustrates an example process 1100 for determining content to be presented via display(s) of a vehicle to facilitate multi-passenger interaction, as described herein.

At operation 1102, the content management component 1027 receives sensor data from sensor components(s) 1006 of a vehicle 1002. As described above, in at least one example, the vehicle 1002 can comprise sensor component(s) 1006, which can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, seat sensors, seatbelt sensors, weight sensors, etc. The sensor component(s) 1006 can provide input to the vehicle computing device(s) 1004. In some examples, the sensor component(s) 1006 can preprocess at least some of the sensor data prior to sending the sensor data to the vehicle computing device(s) 1004. In at least one example, the content management component 1027 can receive sensor data (raw or processed) from the sensor component(s) 1006.

At operation 1104 the content management component 1027 can determine a state of the vehicle 1002. In some examples, the content management component 1027 can receive the sensor data and analyze the sensor data, using a machine-trained model, to determine a state of the vehicle 1002. In some examples, the content management component 1027 can receive an indication of a state of the vehicle 1002 from another component of the vehicle computing device(s) 1004 and can determine the state of the vehicle 1002 based at least in part on such an indication. In some examples, such an indication can be based on sensor data. In some examples, such an indication may be determined without sensor data (e.g., when a component sends a command, such a command can be associated with a state). As described above, example states can include an ingress state, a door opening state, a door closing state, a departing state, a ride-in-progress state, an arriving state, an egress state, or the like. In some examples, each state can be associated with content, or instructions indicative thereof, that can be presented via emitter(s) 1008, as described above.

At operation 1106 the content management component 1027 can determine occupancy state(s) associated with seat(s) of the vehicle 1002. In some examples, the content management component 1027 can receive the sensor data and analyze the sensor data to determine occupancy data associated with individual seat(s) of the vehicle 1002. In some examples, the content management component 1027 can receive an indication of occupancy state(s) of individual seat(s) of the vehicle 1002 from another component of the vehicle computing device(s) 1004 and can determine the occupancy state(s) of the individual seat(s) based at least in part on such an indication. In some examples, such an indication can be based on sensor data. In some examples, such an indication may be determined without sensor data (e.g., when a component sends a command, such a command can be associated with an occupancy state of a seat). In at least one example, occupancy data (e.g., data indicative of occupancy states associated with individual seat(s) of the vehicle 1002) can be used to determine which seat(s) in the vehicle 1002 are occupied (e.g., associated with an occupied state) or not, and such a determination can be used to selectively determine which emitter(s) 1008 to present content on and/or which content to present.

In some examples, the process 1100 can proceed from operation 1102 to operation 1106 (e.g., without first determining a state of the vehicle 1002) as illustrated by the dashed line from operation 1102 to 1106. In some examples, the process 1100 can proceed from operation 1104 to operations 1108 and/or 1110 (e.g., without first determining occupancy state(s) associated with seat(s) of the vehicle 1002), as illustrated by the dashed line from operation 1104 to below operation 1106. In some examples, the process 1100 can begin at operations 1108 and/or 1110 without having received sensor data and/or made a determination with respect to the state of the vehicle and/or occupancy state(s) associated with seat(s) of the vehicle 1002.

At operation 1108, the content management component 1027 can determine first content to present via a first display proximate a first seat of the vehicle 1002. In at least one example, the content management component 1027 can determine first content to present via a first display proximate a first seat of the vehicle 1002 based at least in part on the state of the vehicle (e.g., determined at operation 1104) and/or an occupancy state associated with the first seat (e.g., determined at operation 1106). As described above, in some examples, the occupancy state of the first seat can determine whether content is to be presented via the first display (or not). In some examples, the state of the vehicle 1002 can be mapped to, or otherwise associated with, particular content to be presented via the first display. In some examples, the content management component 1027 can access trip data, user data, context data, and/or the like and can use the trip data, user data, context data, and/or the like further to determine content to present via the first display. That is, in some examples, trip data (e.g., of a first passenger associated with the first seat) can be used to determine content to be presented via the first display, wherein such content is customized or personalized for at least the first passenger based at least in part on their trip. In some examples, user data (e.g., of a first passenger associated with the first seat) can be used to determine content to be presented via the first display. In some examples, as described above, preferences, abilities, classifications, etc. indicated in the user data can be used to customized or personalize content to be presented via the first display. Context data, which can indicate how a first passenger is interacting with the first display (e.g., a recent input), content previously presented via the first display, or the like, can be used to customize or personalize content to be presented via the first display.

In some examples, the content management component 1027 can determine the first content based at least in part on occupancy data associated with the second (or other) seat of the vehicle 1002. In some examples, the content management component 1027 can determine the first content based at least in part on trip data, user data, and/or context data of the second passenger or another passenger. In some examples, the content management component 1027 can determine the first content based at least in part on a determination of whether a condition has been satisfied (e.g., seatbelts of all passengers are fastened, doors are closed, etc.). In some examples, the condition can relate to the first passenger. In other examples, the condition can relate to other passenger(s). That is, in some examples, data associated with other passenger(s) and/or other seat(s) can be used to determine the first content. In some examples, the content management component 1027 can determine the first content based at least in part on a state of another vehicle associated with the vehicle, trip data, user data, and/or context data associated with the other vehicle, or the like. That is, in some examples, the vehicle computing device(s) 1004 can exchange data with vehicle computing device(s) of other vehicles and such data can be used to determine the first content.

In some examples, the content management component 1027 can determine the first content based at least in part on vehicle data associated with the vehicle 1002. Vehicle data can indicate faults of the vehicle 1002, states of individual vehicle components 1002, characteristics of the vehicle 1002, and/or the like.

In some examples, the content management component 1027 can use rule(s) or other instruction(s) to determine the first content. In some examples, the content management component 1027 can use machine-trained model(s) to determine the first content.

At operation 1110, the content management component 1027 can determine second content to present via a second display proximate a second seat of the vehicle 1002. In at least one example, the content management component 1027 can determine second content based at least in part on the state of the vehicle, occupancy state of the second seat, trip data, user data, context data, and/or the like, as described above with reference to operation 1108. In some examples, the occupancy state, trip data, user data, context data, and/or the like can be different for the second seat and/or a second passenger associated with the second seat. As such, in some examples, the second content can be different than the first content. In some examples, however, the second content can be the same as the first content.

In some examples, the content management component 1027 can determine the second content based at least in part on occupancy data associated with the first (or other) seat of the vehicle 1002. In some examples, the content management component 1027 can determine the second content based at least in part on trip data, user data, and/or context data of the first passenger or another passenger. In some examples, the content management component 1027 can determine the second content based at least in part on a determination of whether a condition has been satisfied (e.g., seatbelts of all passengers are fastened, doors are closed, etc.). As described above, in some examples, the condition can be associated with the second passenger. In some examples, the condition can be associated with other passenger(s). That is, in some examples, data associated with other passenger(s) and/or other seat(s) can be used to determine the second content. In some examples, the content management component 1027 can determine the second content based at least in part on a state of another vehicle associated with the vehicle, trip data, user data, and/or context data associated with the other vehicle, or the like. That is, in some examples, the vehicle computing device(s) 1004 can exchange data with vehicle computing device(s) of other vehicles and such data can be used to determine the second content.

In some examples, the content management component 1027 can determine the first content based at least in part on vehicle data associated with the vehicle 1002. Vehicle data can indicate faults of the vehicle 1002, states of individual vehicle components 1002, characteristics of the vehicle 1002, and/or the like.

In some examples, the content management component 1027 can use rule(s) or other instruction(s) to determine the first content. In some examples, the content management component 1027 can use machine-trained model(s) to determine the first content.

At operation 1112, the content management component 1027 can cause the first content to be presented via the first display. In at least one example, the content management component 1027 can cause the first content to be presented via the first display (e.g., via a first graphical user interface). As described above, in some examples, the first content can be additionally or alternatively output via another type of the emitter(s) 108 (e.g., a speaker user interface, a haptic user interface, or the like).

At operation 1114, the content management component 1027 can cause the second content to be presented via the second display. In at least one example, the content management component 1027 can cause the second content to be presented via the second display (e.g., via a second graphical user interface). As described above, in some examples, the second content can be additionally or alternatively output via another type of the emitter(s) 108 (e.g., a speaker user interface, a haptic user interface, or the like).

While FIG. 11 describes an example process 1100 for determining content for presentation via a first display and a second display, the same or similar process can be performed for each display associated with the vehicle 1002. In some examples, the content management component 1027 can determine the first content and the second content at the same time (e.g., synchronously) and cause the first content and the second content to be output via the first display and the second display, respectively, at the same time (e.g., synchronously). In some examples, the content management component 1027 can determine the first content and the second content at different times (e.g., asynchronously) and cause the first content and the second content to be output via the first display and second display, respectively, at different times (e.g., asynchronously). As described above, the content management component 1027 can selectively determine which of the display(s) via which content is to be presented.

In at least one example, the process 1100 can continue as described below with reference to FIG. 12.

FIG. 12 illustrates an example process 1200 for determining whether to update content to be presented via the display(s) of the vehicle 1002 based at least in part on determining an input is received via one of the display(s), as described herein.

At operation 1202, the content management component 1027 can determine whether an input to the first display is detected. As described above, in some examples, content can be presented via a graphical user interface output via a display. In some examples, the graphical user interface can include user interface elements to enable input to the graphical user interface. In some examples, the input can be associated with accessing a particular functionality (e.g., music, HVAC, etc.). In some examples, the input can be associated with a trip. For instance, in some examples, a passenger can interact with the graphical user interface to update a destination and/or otherwise modify a trip. In some examples, the input can be associated with an instruction to cause the vehicle 1002 to perform an operation (e.g., close door(s), start ride, stop ride, open door(s), etc.).

At operation 1204, the content management component 1027 can determine updated first content. In at least one example, based at least in part on receiving the input (e.g., determining that an input to the first display is detected), the content management component 1027 can determine updated first content. In some examples, the updated first content can be determined based at least in part on a state of the vehicle 1002, trip data, user data, and/or context data, as described above. In at least one example, the content management component 1027 can cause the updated first content to be presented via the first display, as illustrated at operation 1206. In some examples, the updated first content can be presented as a new graphical user interface. In some examples, the updated first content can be presented as an update to a graphical user interface that is being presented.

In at least one example, if no input is detected at operation 1202, the process 1200 can return to operation 1102 of FIG. 11, as described above.

At operation 1208, the content management component 1027 can determine whether the input affects the second content. In at least one example, the content management component 1027 can analyze the input to determine whether it affects the second content. For example, the content management component 1027 can determine whether the input is associated with an operation of the vehicle 1002 and/or whether an indication of such an operation is to be communicated to other passenger(s) in the vehicle 1002. Based at least in part on determining that the indication of such is to be communicated to other passenger(s), the content management component 1027 can determine that the input affects the second content. In some examples, the content management component 1027 can determine whether the input is associated with a change to an internal condition of the vehicle 1002 (e.g., temperature, music, lighting, etc.) that affects more than the first passenger. If such a change to an internal condition affects more than the first passenger such that it should be communicated to other passenger(s), the content management component 1027 can determine that the input affects the second content. In some examples, the content management component 1027 can determine whether the input is associated with a modification to a trip (e.g., change of destination and/or other modification) that affects the route of the vehicle 1002 and therefore affects the second content. In some examples, the content management component 1027 can determine whether the input is associated with a modification to an operation of the vehicle 1002 (e.g., open door(s), close door(s), stop moving, start moving, etc.) that affects the second content.

At operation 1210, the content management component 1027 can determine updated second content. Based at least in part on determining that the input affects the second content, the content management component 1027 can determine updated second content. In some examples, the updated second content can be determined based at least in part on a state of the vehicle 1002, trip data, user data, and/or context data, as described above. In at least one example, the content management component 1027 can cause the updated second content to be presented via the second display, as illustrated at operation 1212. In some examples, the updated second content can be presented as a new graphical user interface. In some examples, the updated second content can be presented as an update to a graphical user interface that is being presented. In at least one example, the process 1200 can continue as described below with reference to FIG. 13.

At operation 1214, the content management component 1027 can refrain from updating second content. Based at least in part on determining that the input does not affect the second content, the content management component 1027 can refrain from updating the second content. In some examples, the process 1200 can return to operation 1102 of FIG. 11, as shown in FIG. 12.

FIG. 13 illustrates an example process 1300 for determining whether to update content to be presented via the display(s) of the vehicle 1002 based at least in part on determining whether an override input is received via one of the display(s), as described herein.

At operation 1302, the content management component 1027 can determine whether an input is received via the second display that overrides the first input. In some examples, the updated second content can be presented via a graphical user interface presented via the second display. In some examples, the graphical user interface can include a user interface element that enables the second passenger to provide an input or otherwise interact with the graphical user interface. In some examples, such an input can override the input provided via the first display (e.g., at operation 1202). For example, the first passenger can interact with the graphical user interface presented via the first display to instruct the vehicle 1002 to perform a first operation and the second passenger can interact with the graphical user interface presented via the second display to instruct the vehicle 1002 to perform a second operation that can be in conflict with the first operation. For example, as illustrated above with reference to FIGS. 8A and 8B, the one passenger can request to start a ride and the other passenger can request the doors to be opened. These operations can be in conflict (e.g., the doors cannot be open when the vehicle 1002 is moving). As described above, the storage 1030 can store rule(s) for resolving conflicts between inputs and/or the like. In some examples, the content management component 1027 can access such rule(s) to determine whether two inputs are conflicting and/or which input overrides the other input.

Based at least in part on determining that the input received via the second display overrides the input received via the first display, the content management component 1027 can determine updated first content, as illustrated at operation 1304, and cause the updated first content to be presented via the first display, as illustrated at operation 1306. Based at least in part on determining that the input received via the second display overrides the input received via the first display, the content management component 1027 can determine updated second content, as illustrated at operation 1308, and cause the updated second content to be presented via the second display, as illustrated at operation 1310. In at least one example, the first updated content and the second updated content can be associated with information indicating that an operation associated with the input received via the second display is being performed and/or other information associated with the input received via the second display. In some examples, the updated first content and updated second content can be presented as new graphical user interfaces via the first display and second display, respectively. In some examples, the updated first content and updated second content can be presented as updates to the graphical user interfaces being presented via the first display and second display, respectively.

At operation 1312, the content management component 1027 can refrain from updating the first content or the second content. In at least one example, if the input received via the second display does not override the input received via the first display, the content management component 1027 can refrain from updating the first content or the second content. In some examples, if an input is received via the second display that does not affect the input received via the first display, the content management component 1027 can determine updated second content and cause the updated second content to be presented via the second display. The content management component 1027 can refrain from determining updated first content, however, unless the input affects the first content. In at least one example, the process 1300 can return to operation 1102 of FIG. 11, as illustrated in FIG. 13.

EXAMPLE CLAUSES

A. A vehicle comprising: a plurality of seats disposed in an interior of the vehicle; a plurality of displays, wherein each seat of the plurality of seats is associated with a respective display of the plurality of displays; one or more processors; and one or more non-transitory computer-readable media storing instructions that, when executed by the one or more processors, cause the vehicle to perform operations comprising: receiving sensor data from a sensor associated with the vehicle; determining, based at least in part on the sensor data, a state of the vehicle; determining, based at least in part on the sensor data, an occupancy state associated with each seat of the plurality of seats; determining content to present via a display of the plurality of displays based at least in part on the state of the vehicle and the occupancy state associated with a first seat and an occupancy state associated with a second seat of the plurality of seats, wherein the display is disposed proximate the first seat; and causing the content to be presented via the display.

B. The vehicle as paragraph A recites, wherein the state of the vehicle comprises an ingress state, a door opening state, a door closing state, a departing state, a ride-in-progress state, an arriving state, or an egress state.

C. The vehicle as paragraph A or B recites, the operations further comprising: determining at least one of trip data, user data, or context data associated with a passenger of the vehicle in the first seat; and determining the content further based at least in part on the at least one of the trip data, the user data, or the context data.

D. The vehicle as any of paragraphs A-C recites, the operations further comprising: determining at least one of trip data, user data, or context data associated with a passenger of the vehicle in the second seat; and determining the content further based at least in part on the at least one of the trip data, the user data, or the context data.

E. One or more non-transitory computer-readable media storing instructions that, when executed by one or more processors, cause the one or more processors to perform operations comprising: receiving sensor data from a sensor associated with an interior of a vehicle; determining, based at least in part on the sensor data, a first occupancy state associated with a first seat of the vehicle; determining, based at least in part on the sensor data, a second occupancy state associated with a second seat of the vehicle; determining first content to present via a first display associated with the first seat based at least in part on the first occupancy state and the second occupancy state; and causing the first content to be presented via the first display.

F. The one or more non-transitory computer-readable media as paragraph E recites, wherein the first occupancy state indicates that the first seat is occupied by a passenger and the second occupancy state indicates that the second seat is unoccupied, the operations further comprising determining, based at least in part on the second occupancy state, to refrain from presenting second content via a second display associated with the second seat.

G. The one or more non-transitory computer-readable media as paragraph E or F recites, wherein the first occupancy state indicates that the first seat is occupied by a first passenger and the second occupancy state indicates that the second seat is occupied by a second passenger, the operations further comprising presenting the first content and second content via the first display and a second display associated with the second seat at a same time, wherein the first content and the second content are same content.

H. The one or more non-transitory computer-readable media as any of paragraphs E-G recites, wherein the first occupancy state indicates that the first seat is occupied by a first passenger and the second occupancy state indicates that the second seat is occupied by a second passenger, the operations further comprising presenting the first content and second content via the first display and a second display associated with the second seat at a same time, wherein the first content is different from the second content.

I. The one or more non-transitory computer-readable media as any of paragraphs E-H recites, wherein the first occupancy state indicates that the first seat is occupied by a first passenger and the second occupancy state indicates that the second seat is occupied by a second passenger, the operations further comprising: receiving a first input from the first passenger; determining second content to present via a second display associated with the second seat, wherein the second content includes an indication of the first input; and causing the second content to be presented via the second display.

J. The one or more non-transitory computer-readable media as paragraph I recites, the operations further comprising: receiving a second input from the second passenger; determining that the second input overrides the first input; determining updated first content to present via the first display, wherein the updated first content includes an indication of the second input; and causing the updated first content to be presented via the first display.

K. The one or more non-transitory computer-readable media as any of paragraphs E-J recites, the operations further comprising: determining context data associated with the first display, wherein the context data indicates a recent interaction with the first display, an indication of an input via the second display, or other content previously presented via the first display; and determining a presentation characteristic for presenting the content based at least in part on the context data.

L. The one or more non-transitory computer-readable media as any of paragraphs E-K recites, the operations further comprising: determining an occurrence of an event; determining, based at least in part on determining the occurrence of the event, second content associated with the event; and causing the second content to be presented instead of the first content.

M. The one or more non-transitory computer-readable media as any of paragraphs E-L recites, the operations further comprising: determining at least one of trip data, user data, or context data associated with at least one of a first passenger of the vehicle in the first seat or a second passenger of the vehicle in a second seat; and determining the content further based at least in part on the at least one of the trip data, the user data, or the context data.

N. The one or more non-transitory computer-readable media as any of paragraphs E-M recites, wherein at least one of the first display is associated with a first computing device of a first passenger in the first seat or the second display is associated with a second computing device of a second passenger in the second seat.

O. A method, implemented at least in part by a computing device associated with a vehicle, comprising: determining first data associated with a first passenger of the vehicle, wherein the first passenger occupies a first seat of the vehicle; determining second data associated with a second passenger of the vehicle, wherein the second passenger occupies a second seat of the vehicle; determining, based at least in part on the first data and the second data, first content to present via a first display proximate the first seat in the vehicle; determining, based at least in part on the first data and the second data, second content to present via a second display proximate the second seat in the vehicle; and causing the first content to be presented via the first display and the second content to be presented via the second display at a same time.

P. The method as paragraph O recites, further comprising: determining a state of the vehicle, wherein the state of the vehicle comprises an ingress state, a door opening state, a door closing state, a departing state, a ride-in-progress state, an arriving state, or an egress state; and determining the first content and the second content further based at least in part on the state of the vehicle.

Q. The method as paragraph P recites, further comprising controlling at least one of interior sound or interior lighting based at least in part on the state of the vehicle.

R. The method as any of paragraphs O-Q recites, wherein the first data and the second data are associated with at least one of trip data or user data.

S. The method as any of paragraphs O-R recites, further comprising: receiving an input via the first display; determining updated second content based at least in part on the input; and causing the updated second content to be presented via the second display.

T. The method as paragraph S recites, further comprising: receiving an input via the first display or the second display; determining, as an update signal, that the input at least one of (i) causes a change to a route of the vehicle or (ii) affects a state of the vehicle; determining, based at least in part on the update signal, third content and fourth content; and causing the third content to be presented via the first display and the fourth content to be presented via the second display.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
    a plurality of seats disposed in an interior of the vehicle;
    a plurality of displays, wherein each seat of the plurality of seats is associated with a respective display of the plurality of displays;
    one or more processors; and
    one or more non-transitory computer-readable media storing instructions that, when executed by the one or more processors, cause the vehicle to perform operations comprising:
        receiving sensor data from a sensor associated with the vehicle;
        determining, based at least in part on the sensor data, a state of the vehicle;
        determining, based at least in part on the sensor data, an occupancy state associated with each seat of the plurality of seats;
        determining content to present via a first display of the plurality of displays based at least in part on the state of the vehicle and the occupancy state associated with a first seat and an occupancy state associated with a second seat of the plurality of seats, wherein the first display is disposed proximate the first seat and a second display is disposed proximate the second seat;
        receiving a first input via the first display;
        receiving a second input via the second display;
        determining, based at least in part on the content and one or more of the second input conflicting with or overriding the first input, updated content; and
        causing the updated content to be presented via the first display.

2. The vehicle as claim 1 recites, wherein the state of the vehicle comprises an ingress state, a door opening state, a door closing state, a departing state, a ride-in-progress state, an arriving state, or an egress state.

3. The vehicle as claim 1 recites, the operations further comprising:
    determining at least one of trip data, user data, or context data associated with a passenger of the vehicle in the first seat; and
    determining the content further based at least in part on the at least one of the trip data, the user data, or the context data.

4. The vehicle as claim 1 recites, the operations further comprising:
    determining at least one of trip data, user data, or context data associated with a passenger of the vehicle in the second seat; and
    determining the content further based at least in part on the at least one of the trip data, the user data, or the context data.

5. One or more non-transitory computer-readable media storing instructions that, when executed by one or more processors, cause the one or more processors to perform operations comprising:
    receiving sensor data from a sensor associated with an interior of a vehicle;
    determining, based at least in part on the sensor data, a first occupancy state associated with a first seat of the vehicle;
    determining, based at least in part on the sensor data, a second occupancy state associated with a second seat of the vehicle;
    determining first content to present via a first display associated with the first seat based at least in part on the first occupancy state and the second occupancy state; and
    receiving a first input via the first display;
    receiving a second input via a second display proximate a second seat;
    determining that the second input conflicts with or overrides the first input;
    determining, based at least in part on determining that the second input conflicts with or overrides the first input, updated content to present via the first display; and
    causing the updated content to be presented via the first display.

6. The one or more non-transitory computer-readable media as claim 5 recites, wherein the first occupancy state indicates that the first seat is occupied by a passenger and the second occupancy state indicates that the second seat is unoccupied, the operations further comprising determining, based at least in part on the second occupancy state, to refrain from presenting second content via the second display associated with the second seat.

7. The one or more non-transitory computer-readable media as claim 5 recites, wherein the first occupancy state indicates that the first seat is occupied by a first passenger and the second occupancy state indicates that the second seat is occupied by a second passenger, the operations further comprising presenting the first content and second content via the first display and the second display associated with the second seat at a same time, wherein the first content and the second content are same content.

8. The one or more non-transitory computer-readable media as claim 5 recites, wherein the first occupancy state indicates that the first seat is occupied by a first passenger and the second occupancy state indicates that the second seat is occupied by a second passenger, the operations further comprising presenting the first content and second content via the first display and the second display associated with the second seat at a same time, wherein the first content is different from the second content.

9. The one or more non-transitory computer-readable media as claim 5 recites, wherein the first occupancy state indicates that the first seat is occupied by a first passenger and the second occupancy state indicates that the second seat is occupied by a second passenger, the operations further comprising:
   receiving the first input from the first passenger;
   determining second content to present via the second display associated with the second seat, wherein the second content includes an indication of the first input; and
   causing the second content to be presented via the second display.

10. The one or more non-transitory computer-readable media as claim 9 recites, the operations further comprising:
   receiving the second input from the second passenger;
   determining that the second input overrides the first input; and
   determining updated first content to present via the first display, wherein the updated first content includes an indication of the second input.

11. The one or more non-transitory computer-readable media as claim 5 recites, the operations further comprising:
   determining context data associated with the first display, wherein the context data indicates a recent interaction with the first display, an indication of an input via the second display, or other content previously presented via the first display; and
   determining a presentation characteristic for presenting the first content based at least in part on the context data.

12. The one or more non-transitory computer-readable media as claim 5 recites, the operations further comprising:
   determining an occurrence of an event;
   determining, based at least in part on determining the occurrence of the event, second content associated with the event; and
   causing the second content to be presented instead of the first content.

13. The one or more non-transitory computer-readable media as claim 5 recites, the operations further comprising:
   determining at least one of trip data, user data, or context data associated with at least one of a first passenger of the vehicle in the first seat or a second passenger of the vehicle in the second seat; and
   determining the first content further based at least in part on the at least one of the trip data, the user data, or the context data.

14. The one or more non-transitory computer-readable media as claim 5 recites, wherein at least one of the first display is associated with a first computing device of a first passenger in the first seat or the second display is associated with a second computing device of a second passenger in the second seat.

15. A method, implemented at least in part by a computing device associated with a vehicle, comprising:
   determining first data associated with a first passenger of the vehicle, wherein the first passenger occupies a first seat of the vehicle;
   determining second data associated with a second passenger of the vehicle, wherein the second passenger occupies a second seat of the vehicle;
   determining, based at least in part on the first data and the second data, first content to present via a first display proximate the first seat in the vehicle;
   determining, based at least in part on the first data and the second data, second content to present via a second display proximate the second seat in the vehicle;
   causing the first content to be presented via the first display and the second content to be presented via the second display at a same time;
   receiving a first input via the first display;
   receiving a second input via the second display;
   determining, based at least in part on the second input conflicting with or overriding the first input, updated content to present via the first display; and
   causing the updated content to be presented via the first display.

16. The method as claim 15 recites, further comprising:
   determining a state of the vehicle, wherein the state of the vehicle comprises an ingress state, a door opening state, a door closing state, a departing state, a ride-in-progress state, an arriving state, or an egress state; and
   determining the first content and the second content further based at least in part on the state of the vehicle.

17. The method as claim 16 recites, further comprising controlling at least one of interior sound or interior lighting based at least in part on the state of the vehicle.

18. The method as claim 15 recites, wherein the first data and the second data are associated with at least one of trip data or user data.

19. The method as claim 15 recites, further comprising:
   receiving a third input via the first display;
   determining updated second content based at least in part on the third input; and
   causing the updated second content to be presented via the second display.

20. The method as claim 19 recites, further comprising:
   receiving a fourth input via the first display or the second display;
   determining, as an update signal, that the fourth input at least one of (i) causes a change to a route of the vehicle or (ii) affects a state of the vehicle;
   determining, based at least in part on the update signal, third content and fourth content; and
   causing the third content to be presented via the first display and the fourth content to be presented via the second display.

* * * * *